US011647383B2

(12) United States Patent
Damnjanovic et al.

(10) Patent No.: US 11,647,383 B2
(45) Date of Patent: May 9, 2023

(54) UE CAPABILITY SIGNALING TECHNIQUES FOR WIRELESS COMMUNICATIONS SYSTEMS WITH RELAYS

(71) Applicant: QUALCOMM Incorporated, San Diego, CA (US)

(72) Inventors: Aleksandar Damnjanovic, Del Mar, CA (US); Bibhu Mohanty, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/894,084

(22) Filed: Jun. 5, 2020

(65) Prior Publication Data

US 2020/0396597 A1 Dec. 17, 2020

Related U.S. Application Data

(60) Provisional application No. 62/859,896, filed on Jun. 11, 2019.

(51) Int. Cl.
*H04W 8/24* (2009.01)
*H04W 72/0453* (2023.01)
(Continued)

(52) U.S. Cl.
CPC .......... *H04W 8/24* (2013.01); *H04W 8/005* (2013.01); *H04W 72/048* (2013.01); *H04W 72/0453* (2013.01); *H04W 72/14* (2013.01)

(58) Field of Classification Search
CPC ... H04W 8/005; H04W 8/24; H04W 72/0453; H04W 72/048; H04W 72/14
(Continued)

(56) References Cited

U.S. PATENT DOCUMENTS

2006/0115015 A1\* 6/2006 Oh ................... H04L 25/03171
375/267
2012/0176958 A1\* 7/2012 Queseth ............ H04B 7/15542
370/315
(Continued)

FOREIGN PATENT DOCUMENTS

EP 3621391 A1 3/2020
WO WO-2018203443 A1 11/2018

OTHER PUBLICATIONS

Intel Corporation: "UE Capabilities for LTE Rel.15 V2X Communication", 3GPP Draft, 3GPP TSG RAN WG1 Meeting #93, R1-1806486—INTEL—V2X Capability, 3rd Generation Partnership Project (3GPP), Mobile Competence Centre, 650, Route Des Lucioles, F-06921, Sophia-Antipolis Cedex, France, vol. RAN WG1, No. Busan, Korea, May 21, 2018-May 25, 2018, May 20, 2018 (May 20, 2018), XP051441688, pp. 1-5, Retrieved from the Internet: URL: http://www.3gpp.org/ftp/Meetings%5F3GPP%5FSYNC/RAN1/Docs/ [retrieved on May 20, 2018] Section 5.
(Continued)

*Primary Examiner* — Congvan Tran
(74) *Attorney, Agent, or Firm* — Holland & Hart LLP

(57) ABSTRACT

Methods, systems, and devices for wireless communications are described for communications between a user equipment (UE) and a base station via one or more relays. The UE and base station may establish a direct connection according to a first UE capability, and the UE may identify one or more relays that are in proximity to the UE and that may be used for relaying communications between the UE and the base station. The UE may provide a capability indication of a second UE capability to the base station that indicates transmission parameters associated with at least one relay, which the base station may use to communicate with the UE via the relay. The base station may select which UE capa-
(Continued)

bility to use for communications, which may result in either direct communications with the UE or a connection via the relay.

15 Claims, 21 Drawing Sheets

(51) Int. Cl.
*H04W 72/04* (2023.01)
*H04W 8/00* (2009.01)
*H04W 72/14* (2009.01)

(58) Field of Classification Search
USPC .................................................. 370/328–329
See application file for complete search history.

(56) References Cited

U.S. PATENT DOCUMENTS

| | | | |
|---|---|---|---|
| 2013/0235839 A1* | 9/2013 | Kim | H04W 72/042 370/329 |
| 2014/0301370 A1* | 10/2014 | Sivavakeesar | H04W 36/0005 370/331 |
| 2015/0071248 A1* | 3/2015 | Faerber | H04W 36/0055 370/331 |
| 2015/0163623 A1* | 6/2015 | Kosseifi | H04W 4/02 455/456.3 |
| 2016/0227495 A1 | 8/2016 | Lee et al. | |
| 2018/0054742 A1* | 2/2018 | Kahtava | H04W 16/18 |
| 2018/0123683 A1* | 5/2018 | Wakabayashi | H04W 40/22 |
| 2019/0261342 A1* | 8/2019 | Zhang | H04W 72/1278 |
| 2019/0356445 A1* | 11/2019 | Manolakos | H04B 7/0805 |
| 2020/0068580 A1* | 2/2020 | Tang | H04B 7/2606 |
| 2020/0403673 A1* | 12/2020 | Bontu | H04L 25/03343 |
| 2021/0359733 A1* | 11/2021 | Harrison | H04B 7/0868 |

OTHER PUBLICATIONS

International Search Report and Written Opinion—PCT/US2020/036674—ISA/EPO—Sep. 15, 2020. (193094WO).

* cited by examiner

UE CAPABILITY SIGNALING TECHNIQUES FOR WIRELESS COMMUNICATIONS SYSTEMS WITH RELAYS

CROSS REFERENCE

The present Application for Patent claims the benefit of U.S. Provisional Patent Application No. 62/859,896 by DAMNJANOVIC et al., entitled "UE CAPABILITY SIGNALING TECHNIQUES FOR WIRELESS COMMUNICATIONS SYSTEMS WITH RELAYS," filed Jun. 11, 2019, assigned to the assignee hereof, and expressly incorporated by reference herein.

BACKGROUND

The following relates generally to wireless communications, and more specifically to user equipment (UE) capability signaling techniques for wireless communications systems with relays.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as UE.

SUMMARY

The described techniques relate to improved methods, systems, devices, and apparatuses that support user equipment (UE) capability signaling techniques for wireless communications systems with relays. In various aspects, the described techniques provide for UE identification of one or more relays that are available for communications between the UE and a base station, and UE signaling to the base station to enable communications via the one or more relays. In some cases, the UE and base station may establish a direct connection. In some cases, the direct connection may use a first frequency band (e.g., a sub-7 GHz frequency band which may be referred to as frequency range 1 (FR1)). The UE may identify one or more relays that are in proximity to the UE and that may be used for relaying communications between the UE and the base station such that a data rate between the UE and base station when using the relay exceeds a data rate of the direct connection. In some cases, transmissions between the UE and the one or more relays may use a second frequency band (e.g., a millimeter wave (mmW) frequency band which may be referred to as frequency range 2 (FR2)). The UE may provide a capability indication to the base station that indicates one or more transmission parameters associated with the one or more relays, which the base station may use to then communicate with the UE via the one or more relays. In some cases, the base station may receive the capability indication from the UE, and may select a particular UE capability to use for communications, which may result in direct communications between the UE and base station or a connection via the one or more relays.

A method of wireless communication at a UE is described. The method may include establishing a connection with a base station according to a first UE capability, where the first UE capability indicates a first set of connection parameters, determining a second set of connection parameters for communications with the base station via a first relay, transmitting a UE capability message to the base station, where the UE capability message indicates a second UE capability for communications with the second set of connection parameters, and communicating with the base station via the first relay according to the second UE capability.

An apparatus for wireless communication at a UE is described. The apparatus may include a processor, memory coupled with the processor, and instructions stored in the memory. The instructions may be executable by the processor to cause the apparatus to establish a connection with a base station according to a first UE capability, where the first UE capability indicates a first set of connection parameters, determine a second set of connection parameters for communications with the base station via a first relay, transmit a UE capability message to the base station, where the UE capability message indicates a second UE capability for communications with the second set of connection parameters, and communicate with the base station via the first relay according to the second UE capability.

Another apparatus for wireless communication at a UE is described. The apparatus may include means for establishing a connection with a base station according to a first UE capability, where the first UE capability indicates a first set of connection parameters, determining a second set of connection parameters for communications with the base station via a first relay, transmitting a UE capability message to the base station, where the UE capability message indicates a second UE capability for communications with the second set of connection parameters, and communicating with the base station via the first relay according to the second UE capability.

A non-transitory computer-readable medium storing code for wireless communication at a UE is described. The code may include instructions executable by a processor to establish a connection with a base station according to a first UE capability, where the first UE capability indicates a first set of connection parameters, determine a second set of connection parameters for communications with the base station via a first relay, transmit a UE capability message to the base station, where the UE capability message indicates a second UE capability for communications with the second set of connection parameters, and communicate with the base station via the first relay according to the second UE capability.

In some examples of the method, apparatuses, and non-transitory computer-readable medium described herein, the connection with the base station according to the first UE capability uses a first frequency band, and where transmissions between the UE and the first relay may be on a second frequency band and transmissions between the base station and the first relay may be on the first frequency band.

Some examples of the method, apparatuses, and non-transitory computer-readable medium described herein may further include operations, features, means, or instructions for receiving, responsive to the transmitting the UE capability message, a transmission from the base station to enable the second UE capability, and where the communicating with the base station via the first relay may be performed responsive to the transmission from the base station to enable the second UE capability.

In some examples of the method, apparatuses, and non-transitory computer-readable medium described herein, the second set of connection parameters include one or more of a number of antennas available for communications, a maximum supportable data rate associated with communications via the first relay, an acknowledgment timeline for communicating acknowledgment feedback between the UE and the base station, a downlink-to-uplink grant timeline between the UE receiving a grant and transmitting a responsive uplink transmission, a feedback processing timeline, one or more quality of service parameters, or any combinations thereof. In some examples of the method, apparatuses, and non-transitory computer-readable medium described herein, the number of antennas available for communications correspond to the number of antennas at the first relay available for communications with the base station, and where the number of antennas at the first relay may be greater than a number of antennas at the UE that may be available for communications with the base station. In some examples of the method, apparatuses, and non-transitory computer-readable medium described herein, the one or more quality of service parameters include one or more of a latency parameter, an error rate parameter, a jitter parameter, or any combinations thereof.

In some examples of the method, apparatuses, and non-transitory computer-readable medium described herein, the UE capability message may be a first UE capability message. In some examples of the method, apparatuses, and non-transitory computer-readable medium described herein may further include operations, features, means, or instructions for determining a third set of connection parameters for communications with the base station via a second relay, transmitting a second UE capability message to the base station, where the second UE capability message indicates the third set of connection parameters, and receiving, responsive to the transmitting the first UE capability message and the second UE capability message, a transmission from the base station to enable the second UE capability, and where the communicating with the base station via the first relay may be performed responsive to the transmission from the base station to enable the second UE capability.

Some examples of the method, apparatuses, and non-transitory computer-readable medium described herein may further include operations, features, means, or instructions for determining a third set of connection parameters for communications with the base station via a second relay, and where the UE capability message indicates the second set of connection parameters that may be associated with the first relay and indicates the third set of connection parameters that may be associated with the second relay. In some examples of the method, apparatuses, and non-transitory computer-readable medium described herein, the communicating with the base station may be via both the first relay and the second relay according to the second UE capability.

In some examples of the method, apparatuses, and non-transitory computer-readable medium described herein, the UE may be configured to communicate with the base station on a first frequency band using a first set of antennas, and the UE may be configured to communicate with the first relay on a second frequency band using a second set of antennas that may be different than the first set of antennas. In some examples of the method, apparatuses, and non-transitory computer-readable medium described herein, the first frequency band may be a sub 7 gigahertz frequency band and the second frequency band may be a millimeter wave frequency band. In some examples of the method, apparatuses, and non-transitory computer-readable medium described herein, the first frequency band may be a sub 7 gigahertz frequency band and the second frequency band may be a shared radio frequency spectrum band. In some examples of the method, apparatuses, and non-transitory computer-readable medium described herein, the first relay includes a layer 1 relay between the base station and the UE. In some examples of the method, apparatuses, and non-transitory computer-readable medium described herein, the first relay performs at least a portion of physical layer processing of traffic that may be transmitted between the UE and the base station.

A method of wireless communication at a base station is described. The method may include establishing a connection with a UE according to a first UE capability, where the first UE capability indicates a first set of connection parameters for communications with the UE, receiving, from the UE, a UE capability message that indicates a second UE capability and a second set of connection parameters, where the second set of connection parameters are associated with a first relay identified by the UE for communications with the base station, and communicating with the UE via the first relay according to the second UE capability.

An apparatus for wireless communication at a base station is described. The apparatus may include a processor, memory coupled with the processor, and instructions stored in the memory. The instructions may be executable by the processor to cause the apparatus to establish a connection with a UE according to a first UE capability, where the first UE capability indicates a first set of connection parameters for communications with the UE, receive, from the UE, a UE capability message that indicates a second UE capability and a second set of connection parameters, where the second set of connection parameters are associated with a first relay identified by the UE for communications with the base station, and communicate with the UE via the first relay according to the second UE capability.

Another apparatus for wireless communication at a base station is described. The apparatus may include means for establishing a connection with a UE according to a first UE capability, where the first UE capability indicates a first set of connection parameters for communications with the UE, receiving, from the UE, a UE capability message that indicates a second UE capability and a second set of connection parameters, where the second set of connection parameters are associated with a first relay identified by the UE for communications with the base station, and communicating with the UE via the first relay according to the second UE capability.

A non-transitory computer-readable medium storing code for wireless communication at a base station is described. The code may include instructions executable by a processor to establish a connection with a UE according to a first UE capability, where the first UE capability indicates a first set of connection parameters for communications with the UE, receive, from the UE, a UE capability message that indicates a second UE capability and a second set of connection parameters, where the second set of connection parameters are associated with a first relay identified by the UE for communications with the base station, and communicate with the UE via the first relay according to the second UE capability.

In some examples of the method, apparatuses, and non-transitory computer-readable medium described herein transmissions between the UE and the base station may be on a first frequency band, transmissions between the UE and the first relay may be on a second frequency band, and transmissions between the base station and the first relay may be on the first frequency band.

Some examples of the method, apparatuses, and non-transitory computer-readable medium described herein may further include operations, features, means, or instructions for determining, responsive to the receiving the UE capability message, that the second UE capability may be to be used for communications between the UE and the base station, and transmitting, an indication to the UE to enable the second UE capability.

In some examples of the method, apparatuses, and non-transitory computer-readable medium described herein, the second set of connection parameters include one or more of a number of antennas available for communications, a maximum supportable data rate associated with communications via the first relay, an acknowledgment timeline for communicating acknowledgment feedback between the UE and the base station, a downlink-to-uplink grant timeline between the UE receiving a grant and transmitting a responsive uplink transmission, a feedback processing timeline, one or more quality of service parameters, or any combinations thereof.

In some examples of the method, apparatuses, and non-transitory computer-readable medium described herein, the number of antennas available for communications correspond to the number of antennas at the first relay available for communications with the base station, and where the number of antennas at the first relay may be greater than a number of antennas at the UE that may be available for communications with the base station. In some examples of the method, apparatuses, and non-transitory computer-readable medium described herein, the one or more quality of service parameters include one or more of a latency parameter, an error rate parameter, a jitter parameter, or any combinations thereof.

Some examples of the method, apparatuses, and non-transitory computer-readable medium described herein may further include operations, features, means, or instructions for receiving a second UE capability message that indicates a third UE capability and a third set of connection parameters, selecting the second UE capability for communications between the UE and the base station from the first UE capability, the second UE capability, and the third UE capability, and transmitting an indication to the UE to enable the second UE capability. In some examples of the method, apparatuses, and non-transitory computer-readable medium described herein, the UE capability message further includes a third set of connection parameters for communications via a second relay. In some examples of the method, apparatuses, and non-transitory computer-readable medium described herein, the communicating with the UE may be via both the first relay and the second relay according to the second UE capability.

In some examples of the method, apparatuses, and non-transitory computer-readable medium described herein, the UE may be configured to communicate with the base station on a first frequency band using a first set of antennas, and the UE may be configured to communicate with the first relay on a second frequency band using a second set of antennas that may be different than the first set of antennas. In some examples of the method, apparatuses, and non-transitory computer-readable medium described herein, the first frequency band may be a sub 7 gigahertz frequency band and the second frequency band may be a millimeter wave frequency band. In some examples of the method, apparatuses, and non-transitory computer-readable medium described herein, the first frequency band may be a sub 7 gigahertz frequency band and the second frequency band may be a shared radio frequency spectrum band. In some examples of the method, apparatuses, and non-transitory computer-readable medium described herein, the first relay includes a layer 1 relay between the base station and the UE. In some examples of the method, apparatuses, and non-transitory computer-readable medium described herein, the first relay performs at least a portion of physical layer processing of traffic that may be transmitted between the UE and the base station.

DETAILED DESCRIPTION

Figure 1:
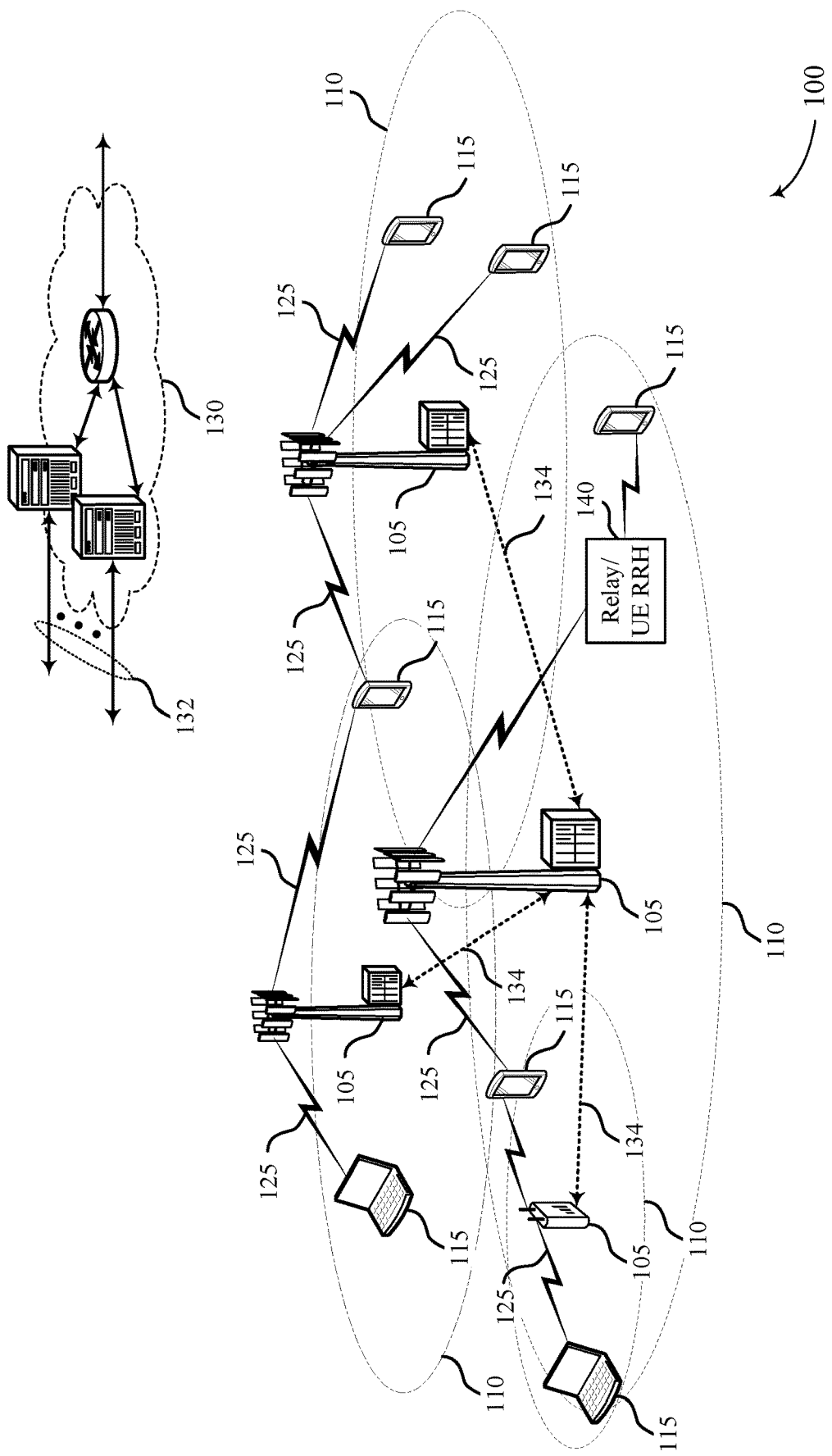
FIG. 1 illustrates an example of a system for wireless communications that supports UE capability signaling techniques for wireless communications systems with relays in accordance with aspects of the present disclosure.

In some wireless communications, a user equipment (UE) may communicate with a base station using physical antennas located at the UE. For instance, the UE may use the antennas to transmit uplink signals to the base station or to receive downlink signals from the base station. Some techniques at a UE for communicating with a base station may not fully exploit the potential capabilities of the physical antennas at the UE (i.e., the UE hardware). For example, some wireless communications may support communication between UEs and base stations on multiple bands. In such systems, UEs may be configured to use one set of antennas to communicate on one band and another set of antennas to communicate on a different band. In some cases, a UE may have a direct link to a base station on one band (e.g., on a sub-7 GHz or frequency range one (FR1) band) and may not communicate with the base station using the antennas designed for communicating on another band (e.g., on a millimeter wave (mmW) or frequency range two (FR2) band). Thus, the UE may not fully exploit the potential capabilities of the antennas at the UE, which may be detrimental to the UE (e.g., in poor radio conditions). That is, the quality of a direct link with a base station may limit the maximum throughput or data rate of communications with the base station, and the throughput or data rate may be further limited by the number of antennas being used to communicate.

As described herein, a wireless communications system may support efficient techniques for enhancing throughput. In particular, the described techniques performed at a UE provide for communicating directly with a base station using a first set of antennas and communicating indirectly with the base station (e.g., via a relay) using a second set of antennas to exploit the potential capabilities of additional or other physical antennas at the UE than the first set of antennas. For example, some UEs (e.g., handheld UEs) may have a form factor that limits the first set of antennas to a certain number of physical antenna elements (e.g., 4 antenna elements for FR1), while the second set of antennas may have more antenna elements (e.g., 16 antenna elements for FR2). The additional antenna elements of the second set of antennas, coupled with a potentially higher bandwidth of FR2, may allow for higher data rates than a connection via the first set of antennas on FR1. Further, in some cases one or more relays may have a form factor that allows more FR1 antennas than the UE can accommodate (e.g., due to a larger size or available area for an antenna array). Thus, such a relay may support higher data rates with the base station than would be supported by the UE, even in cases where the UE and relay have similar channel conditions. Further, in some cases such a relay may be configured with one or more antenna panels with antenna elements for FR2 communications. Accordingly, in some cases, the base station and UE may communicate via the relay, where communications between the UE and the relay use FR2 and communications between the base station and the relay use FR1. In such a manner, the connection between the UE and base station via the relay may support a higher data rate than a direct FR1 connection between the UE and base station.

In various aspects, the UE may identify one or more relays that are available for communications between the UE and the base station. The UE may, for example, identify a relay and various associated transmission parameters (e.g., number of antennas, supportable data rate, latency, error rate, jitter, etc.), and may provide signaling to the base station to enable communications via the one or more relays using the identified transmission parameters. In some cases, the UE and base station may establish a direct connection using a first frequency band (e.g., a FR1 connection). The UE may then transmit the signaling to the base station to enable communications via the one or more relays. In some cases, the UE may provide a capability indication to the base station that indicates a UE capability for communications using the one or more transmission parameters associated with the one or more relays. The base station may use the provided UE capability to communicate with the UE via the one or more relays. In some cases, the base station may receive the capability indication from the UE, and may select a particular UE capability to use for communications, which may result in direct communications between the UE and base station or a connection via the one or more relays. Relays as discussed herein may include, for example, UE remote radio heads, relays associated with consumer premises equipment (CPE), relay UEs (i.e., other UE(s) that act as relays), or any combinations thereof.

Aspects of the disclosure are initially described in the context of various exemplary wireless communications systems. Various techniques for communications via relays are then described in accordance with several examples. Aspects of the disclosure are further illustrated by and described with reference to apparatus diagrams, system diagrams, and flowcharts that relate to UE capability signaling techniques for wireless communications systems with relays.

FIG. 1 illustrates an example of a wireless communications system 100 that supports UE capability signaling techniques for wireless communications systems with relays in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like. In some examples, base station 105 and UEs 115 may wirelessly communicate via one or more relays 140, which may also be referred to as a UE remote radio head (RRH) 140, that may support the retransmission of signals at different frequency ranges between a UE 115 and a base station 105 (e.g., relaying FR1 communications between the UE RRH 140 and base station 105 as FR2 communications between the UE RRH 140 and the UE 115).

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105. In some cases, D2D communications may be relayed through one or more UE RRHs140.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130). Backhaul links 132, 134 may be wireline links or wireless links (e.g., in an integrated access and backhaul (IAB) deployment).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a base station radio head, a smart radio head, or a transmission/reception point (TRP). In some configurations, various functions of each access network entity or base station 105 may be distributed across various network devices (e.g., base station radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

UEs 115 in the wireless communications system 100 may be configured to use a first set of antennas to communicate on one band (e.g., on FR1) and a second set of antennas to communicate on a different band (e.g., on FR2 or on a shared radio frequency spectrum band). In some cases, one or more UEs 115 may communicate on a sub-7 GHz band (i.e., FR1) and a mmW band (i.e., FR2) using different sets of antennas, or UEs 115 may communicate on different mmW bands using different sets of antennas. In some cases, a UE 115 may have a direct link to a base station 105 on one band (e.g., on FR1 using the first set of antennas) and may not communicate with the base station 105 using the second set of antennas designed for communicating on another band (e.g., the second set of antennas on FR2). Thus, the UE 115 may not fully exploit the potential capabilities of all of the antennas available for use at the UE 115, which may result in the UE 115 communicating at lower data rates than may be available if the UE 115 were to use the second set of antennas instead of, or in addition to, the first set of antennas. Wireless communications system 100 may support efficient techniques at a UE 115 for using additional or alternative antennas for communicating with a base station 105 via UE RRH 140 to improve throughput.

Figure 2:
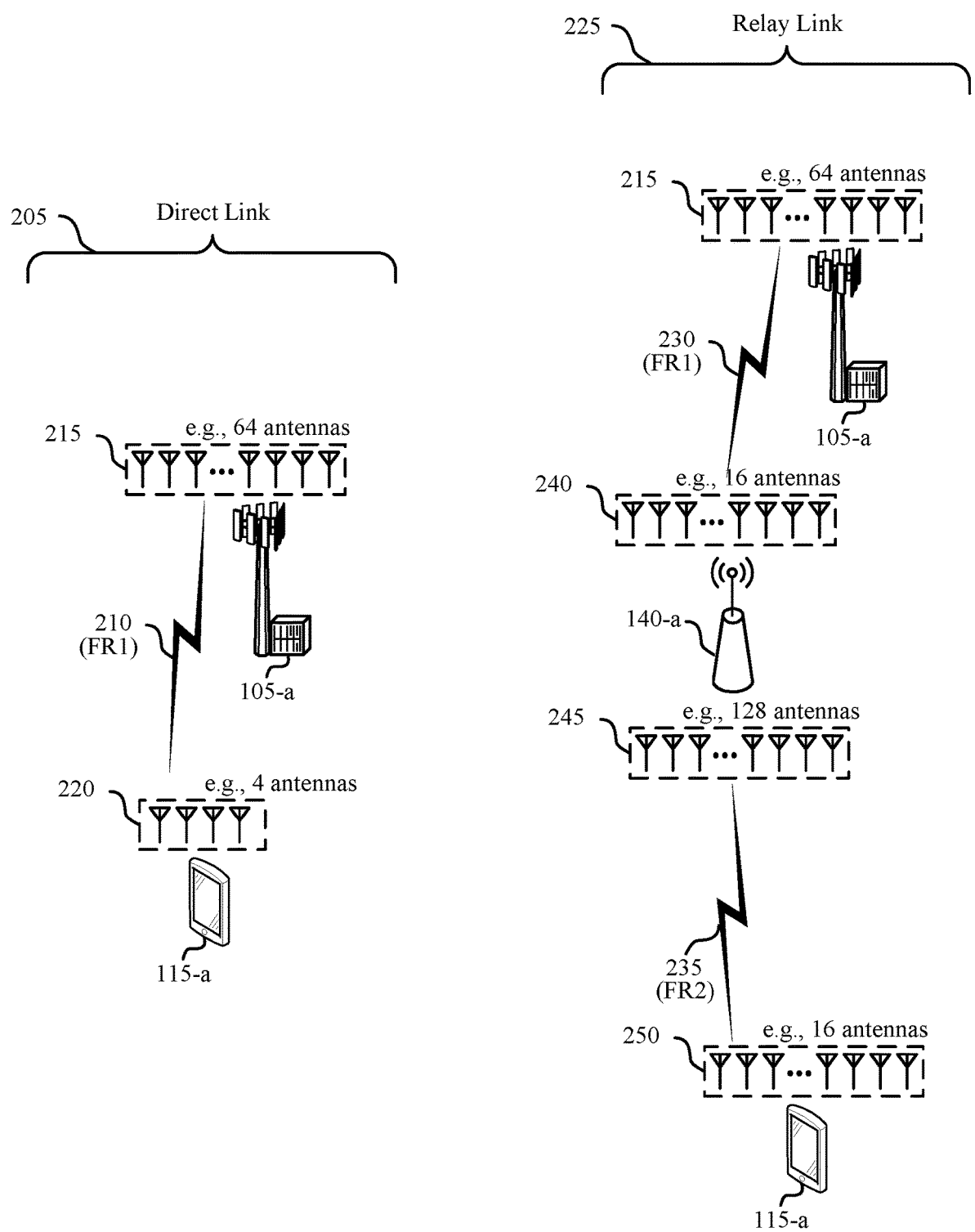
FIG. 2 illustrates an example of a wireless communications system that supports UE capability signaling techniques for wireless communications systems with relays in accordance with aspects of the present disclosure.

FIG. 2 illustrates an example of a wireless communications system 200 that supports UE capability signaling techniques for wireless communications systems with relays in accordance with aspects of the present disclosure. In some examples, wireless communications system 200 may implement aspects of wireless communications system 100. Wireless communications system 200 may support communications between base stations 105 and UEs 115, including communications via a direct link 205 between base station 105-a and UE 115-a, and via a relay link 225 in which a UE RRH 140-a relays communications between base station 105-*a* and UE 115-*a*. The UEs 115, base stations 105, and UE RRH 140 may be examples of the corresponding devices described with reference to FIG. 1.

In the example of FIG. 2, UE 115-*a* may communicate directly with base station 105-*a* in direct link 205 configuration, in which the base station 105-*a* may use a set of base station antennas 215 for FR1 communications 210 directly with a first set of antennas 220 at the UE 115-*a*. In this example, the set of base station antennas 215 may include 64 antennas in an antenna array that may span one or more antenna panels at the base station 105-*a*. Further, in this example, the UE 115-*a* may have four antennas in the first set of antennas 220. In some cases, the number of antennas that may be present at the UE 115-*a* for FR1 communications may be limited by the form factor of the UE 115-*a* (e.g., a handheld UE may have sufficient area for up to four antennas that are configured for FR1 communications). In the example of FIG. 2, the UE 115-*a* may also have a second set of antennas 250 that may support communications on a second frequency band, such as a FR2 or mmW band, or on a shared radio frequency spectrum band. In this example, the second set of antennas 250 at UE 115-*a* may include 16 antennas.

In the case where the base station 105-*a* and UE 115-*a* communicate via the relay link 225, a relay or UE RRH 140-*a* may communicate with the base station 105-*a* via a FR1 link 230. The FR1 link 230 may use the base station antennas 215 of the base station 105-*a* and FR1 RRH antennas 240 at the UE RRH 140-*a*. In this case, the FR1 RRH antenna array 240 may include 16 antennas, as the UE RRH 140-*a* may have a form factor that permits additional FR1 antenna elements as compared to the UE 115-*a*. The FR1 antenna array 240 at the UE RRH 140-*a* may thus be able to support higher FR1 data rates via the FR1 link 230 than are able to be supported by the direct FR1 communications 210 between the base station 105-*a* and UE 115-*a*. The UE RRH 140-*a* may then communicate with the UE 115-*a* via a FR2 link 235. The FR2 link 235 may use a FR2 RRH antenna array 245 at the UE RRH 140-*a* and the second set of antennas 250 at the UE 115-*a*. In this example, the FR2 RRH antenna array 245 may include 128 antennas, and the second set of antennas 250 at the UE 115-*a* may include 16 antennas. The antennas for FR2 communications may have a smaller physical size than antenna elements for FR1 communications, and a spacing between FR2 antenna elements may be smaller than a spacing between FR1 antenna elements, and thus the form factor of the UE 115-*a* may allow for additional antenna elements in the second set of antennas 250 relative to the number of antenna elements in the first set of antenna elements 220 at the UE 115-*a*. It is noted that while the examples of FIG. 2 describe sub-7 GHz or FR1 communications and mmW or FR2 communications for different communications, other frequency bands may be used for such communications and techniques discussed herein may be used for such other frequency bands, or different combinations of frequency bands.

In some cases, the UE 115-*a* may identify the UE RRH 140-*a* as being available for the relay link 225 (e.g., based on one or more reference signals that may be transmitted by the UE RRH 140-*a* to allow discovery of the UE RRH 140-*a*). The UE 115-*a* may determine, based on the identification of the UE RRH 140-*a*, one or more transmission parameters for FR1 communications at the UE RRH 140-*a*. The UE 115-*a*, in some cases, may provide the transmission parameters for FR1 communications to the base station 105-*a*. In some cases, the transmission parameters for FR1 communications with UE RRH 140-*a* may be provided to the base station 105-*a* in an indication of a capability of the UE 115-*a*. In some cases, the base station 105-*a* may receive the updated FR1 communications parameters and use the updated parameters for communications, and may be unaware that the communications are being routed through the UE RRH 140-*a*. Thus, similar to base station remote radio heads that may be transparent to a UE when in communication with a base station, the UE RRH 140-*a* may be transparent to the base station 105-*a*.

Such relay techniques may allow a UE to more fully exploit the combined benefits of multiple available frequency bands, such as sub-7 GHz and mmW and/or unlicensed bands, for an improved user perceived throughput. The sub-7 GHz frequency band may be more suitable for coverage with massive MIMO to maximize data rate, and the mmW or unlicensed frequency band may be more suitable for close range high data rate communications. Thus, UE RRH 140-*a* may allow base station 105-*a* to better exploit massive MIMO, and the base station 105-*a* to UE RRH 140-*a* data rate may be increased compared to a direct base station 105-*a* to UE 115-*a* link due to the larger number antennas.

Further, the UE RRH 140-*a* may be non-collocated with other network nodes, or may be collocated with other network nodes. The UE RRH 140-*a* to UE 115-*a* link may support higher data rates than a FR1 UE connection due to larger bandwidth and directional transmissions. In other cases, both the UE RRH 140-*a* to UE 115-*a* link and the UE RRH 140-*a* to base station 105-*a* link may be on FR1 that may support higher data rates due to, for example, higher supported coding rates, etc., than direct link 205. Thus, the end-to-end data rate of the relay link 225 may be higher than what would be possible with the direct link 205.

Figure 3:
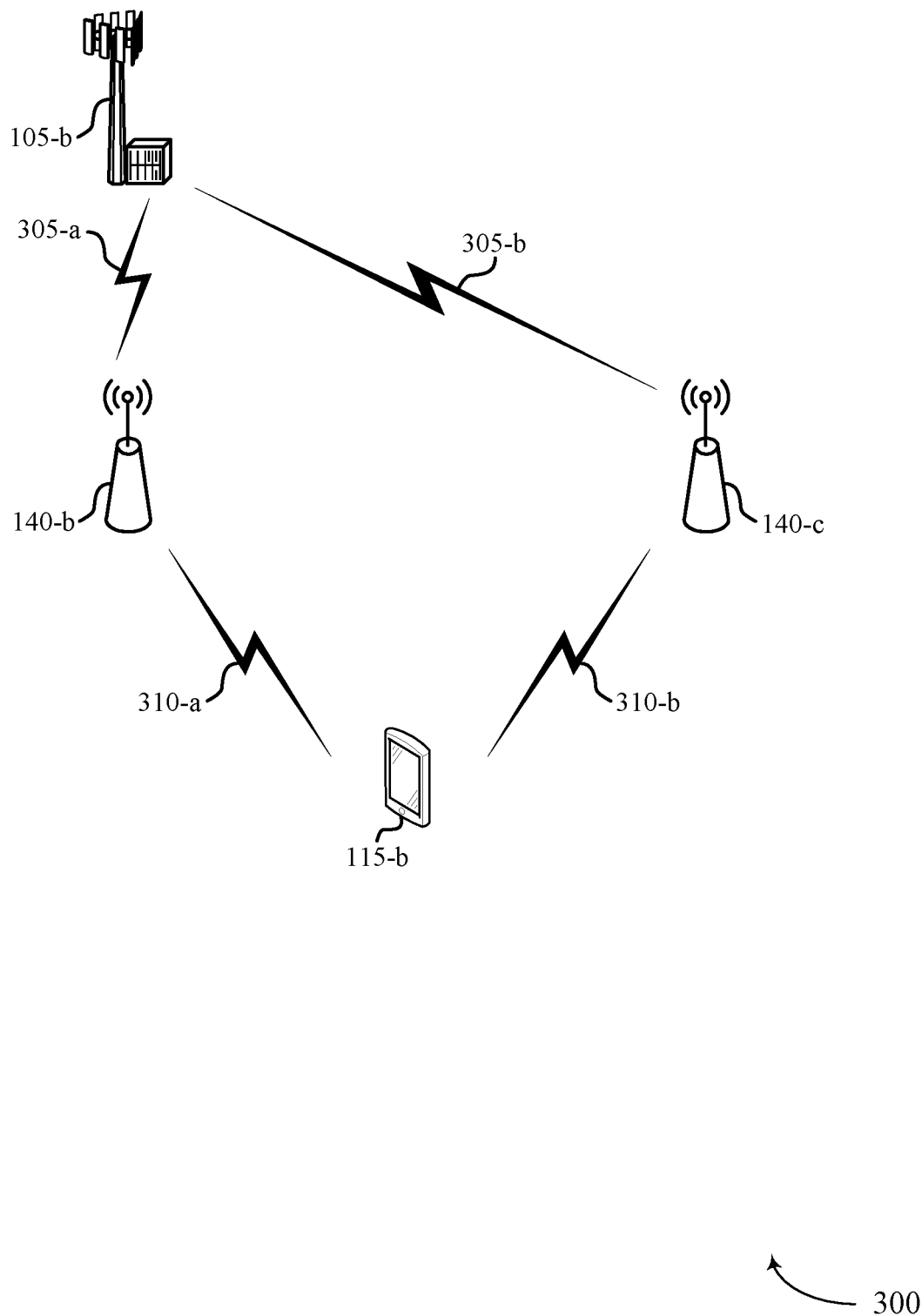
FIG. 3 illustrates an example of a relay connection that supports UE capability signaling techniques for wireless communications systems with relays in accordance with aspects of the present disclosure.

FIG. 3 illustrates an example of a relay connection 300 that supports UE capability signaling techniques for wireless communications systems with relays in accordance with aspects of the present disclosure. In some examples, relay connection 300 may implement aspects of wireless communications system 100 or 200. In this example, a UE 115-*b* may communicate with base station 105-*b* via a first UE RRH 140-*b* and a second UE RRH 140-*c* using coordinated multipoint (CoMP) communications techniques. In this example, the base station 105-*b* may communicate with first UE RRH 140-*b* via a first MU-MIMO link 305-*a* and may communicate with a second UE RRH 140-*c* via a second MU-MIMO link 305-*b*. The MU-MIMO links 305 may be referred to as MU-MIMO backhaul links and may be on a first frequency band, such as FR1. The UE 115-*b* may communicate with the first UE RRH 140-*b* via a first fronthaul link 310-*a* and may communicate with the second UE RRH 140-*c* via a second fronthaul link 310-*b*. The fronthaul links 310 may be on a second frequency band, such as FR2.

In some cases, the multiple UE RRHs 140 may aggregate traffic to the single UE 115-*b*, which may further alleviate form factor limitations of the UE RRHs 140. For example, if each UE RRH 140 has 16 FR1 antennas that support a first data rate, the aggregated transmissions to both the first UE RRH 140-*b* and the second UE RRH 140-*b* may support a higher aggregate data rate. Thus, such techniques may provide virtual MIMO between the base station 105-*b* and the UE 115-*b*.

The systems of FIGS. 2 and 3 may be deployed in a number of scenarios. In some cases, such scenarios may include cases where it is desirable to have UE fronthaul links that provide relatively low latency and high data rates. In some cases, ultra-reliability of UE fronthaul links may be desirable, and in some cases the reliability of the UE fronthaul links may be an order of magnitude higher than the backhaul links. The UE fronthaul link spectrum may be licensed or unlicensed mmW spectrum, and possibly 6 GHz unlicensed spectrum. In some cases, UE fronthaul link technology may use NR FR2 techniques to provide relatively large bandwidth and directional communications. In some cases, UE fronthaul links may use one or more unlicensed or shared radio frequency bands that may offer even larger bandwidth (e.g., NR-U, IEEE 802.11ay, IEEE 802.11be, etc.). Backhaul links between the UE RRHs 140 and the base stations 105 may use lower frequencies in some cases, such as FR1, and provide flexible timelines for downlink grants to uplink transmissions and for HARQ feedback. In some cases, UEs 115 may provide credentials for network access (e.g., a SIM card at the UE may provide credentials), and the UE RRH 140 may not provide any credentials. In some deployment scenarios, a property owner may provide and maintain a number of UE RRHs 140 at a particular location (e.g., a shopping center, food service establishment, sporting venue, theater venue, etc.) that UEs may use to enhance connection bandwidth while at a particular location.

Figure 4:
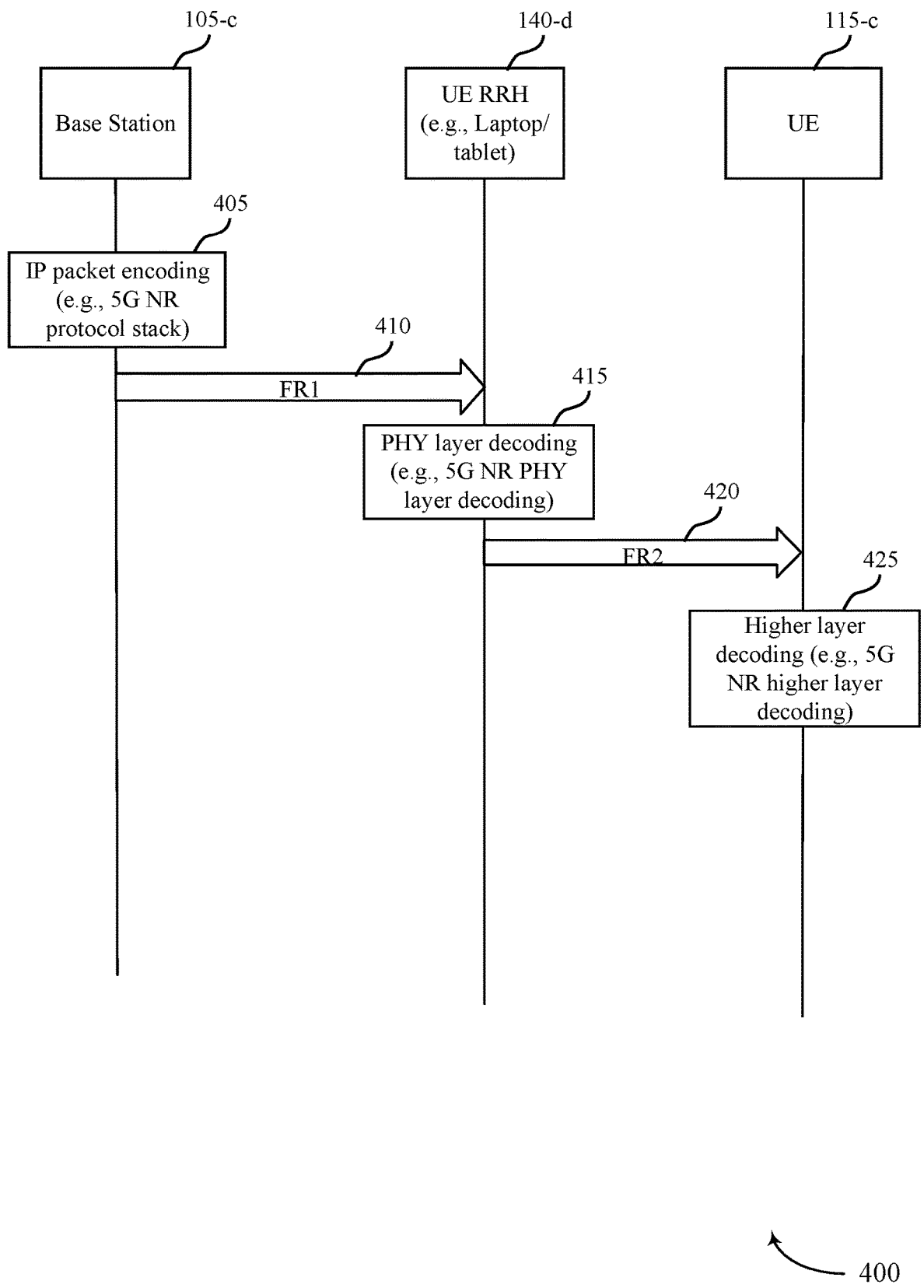
FIG. 4 illustrates an example of a process flow that supports UE capability signaling techniques for wireless communications systems with relays in accordance with aspects of the present disclosure.

FIG. 4 illustrates an example of a downlink process flow 400 that supports UE capability signaling techniques for wireless communications systems with relays in accordance with aspects of the present disclosure. In some examples, process flow 400 may implement aspects of wireless communications system 100, 200, or 300. In this example, a base station 105-*c* may communicate with a UE 115-*c* via a UE RRH 140-*d*. In this example, the UE RRH 140*d* may be implemented in a laptop or tablet computer that may have a form factor that supports more antennas for a first frequency band than the UE 115-*c*, and the base station 105-*c* may use the first frequency band for communications.

In this example, at 405, the base station 105-*c* may perform IP packet encoding. The IP packet encoding may be performed, for example, according to the 5G NR protocol stack to generate a waveform for transmission on a first frequency band, such as FR1. At 410, the base station 105-*c* may transmit FR1 transmissions that may be received at UE RRH 140-*d*.

At 415, the UE RRH 140*d* may perform physical layer decoding of the received FR1 transmissions. For example, the UE RRH 140*d* may perform 5G NR physical layer decoding. In this example, the UE RRH 140*d* may perform physical layer encoding for a second frequency band, such as FR2, and at 420 may transmit FR2 transmissions to the UE 115-*c*. In some cases, the FR1 transmissions may support a relatively higher data rate than could be supported by direct FR1 transmissions to the UE 115-*c* due to a larger number of antennas at the UE RRH 140-*d*. Further, the FR2 transmissions to the UE 115-*c* may support the increased data rate of the FR1 transmissions due to a larger bandwidth, additional antennas available at the UE 115-*c* for such transmissions, or combinations thereof.

At 425, the UE 115-*c* may receive the FR2 transmissions and perform physical and higher layer decoding. For example, the UE 115-*c* may perform FR2-based physical layer decoding and may perform 5G NR higher layer decoding.

Figure 5:
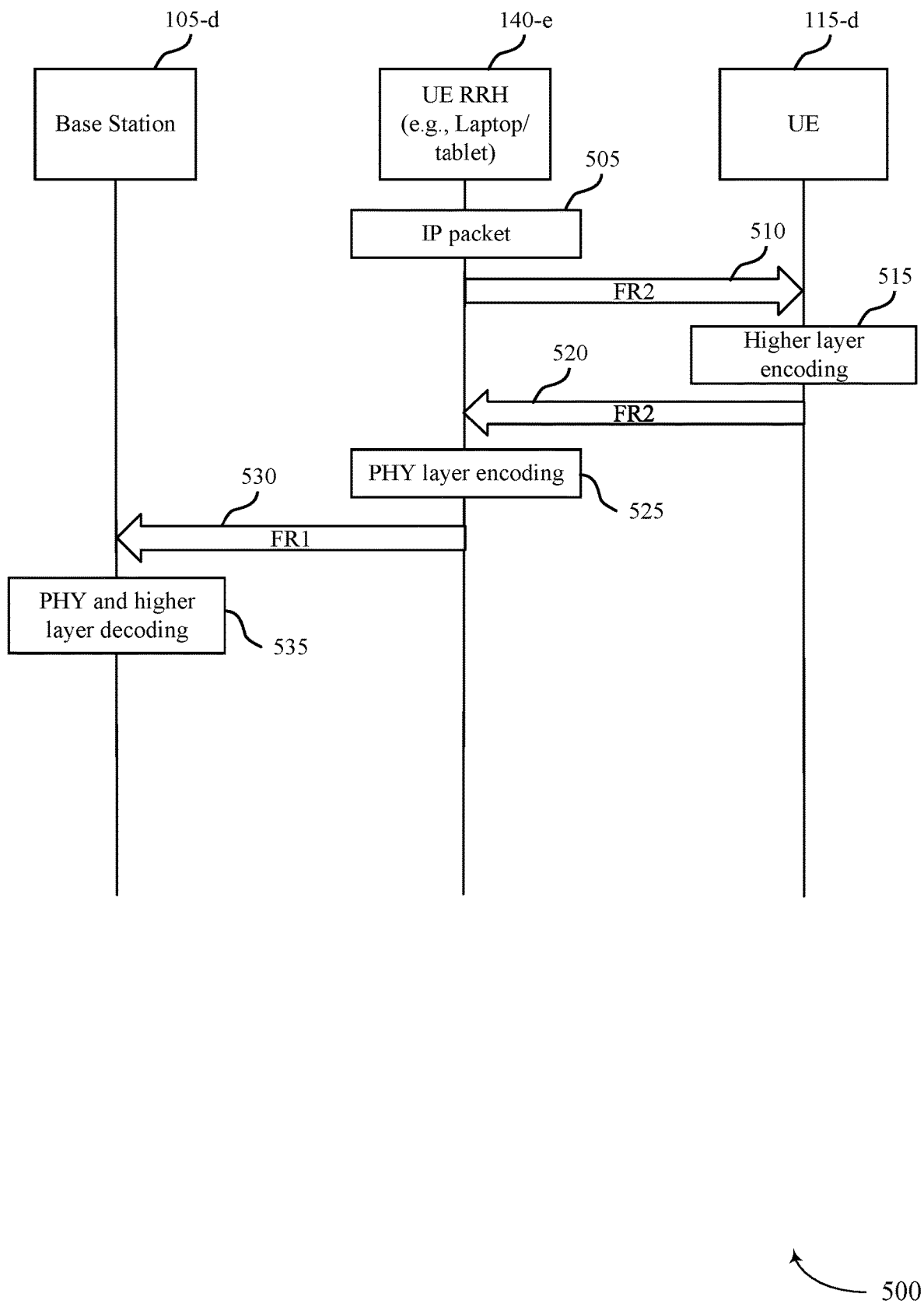
FIG. 5 illustrates an example of a process flow that supports UE capability signaling techniques for wireless communications systems with relays in accordance with aspects of the present disclosure.

FIG. 5 illustrates an example of an uplink process flow 500 that supports UE capability signaling techniques for wireless communications systems with relays in accordance with aspects of the present disclosure. In some examples, process flow 500 may implement aspects of wireless communications system 100, 200, or 300. In this example, a base station 105-*d* may communicate with a UE 115-*d* via a UE RRH 140-*e*. In this example, the UE RRH 140-*e* may again be implemented in a laptop or tablet computer that may have a form factor that supports more antennas for a first frequency band than the UE 115-*d*, and the base station 105-*d* may use the first frequency band for communications.

In this example, at 505, the UE RRH 140-*e* may receive IP packets (e.g., from base station 105-*d* via FR1 transmissions such as discussed with reference to FIG. 4), perform physical layer encoding for a second frequency band, such as FR2, and at 510 may transmit FR2 transmissions to the UE 115-*d*. In some cases, the FR1 transmissions received at UE RRH 140-*e* may support a relatively higher data rate than could be supported by direct FR1 transmissions between the base station 105-*d* and the UE 115-*d* due to a larger number of antennas at the UE RRH 140-*e*. Further, the FR2 transmissions to the UE 115-*d* may support the increased data rate of the FR1 transmissions due to a larger bandwidth, additional antennas available at the UE 115-*d* for such transmissions, or combinations thereof.

At 515, the UE 115-*d* may perform physical and higher layer encoding. For example, the UE 115-*d* may perform FR2-based higher layer encoding and may perform 5G NR physical layer encoding. The UE 115-*d* may, at 520, transmit FR2 transmissions to the UE RRH 140-*e*.

The UE RRH 140-*e* may, at 525, receive the FR2 transmissions from the UE 115-*d* and perform physical layer decoding of the transmissions. At 525, the UE RRH 140-*e* may perform physical layer encoding on the received packets and at 530 may transmit FR1 transmissions to the base station 105-*c*. The base station 105-*d* may receive the FR1 transmissions and, at 535, perform physical and higher layer decoding.

Figure 6:
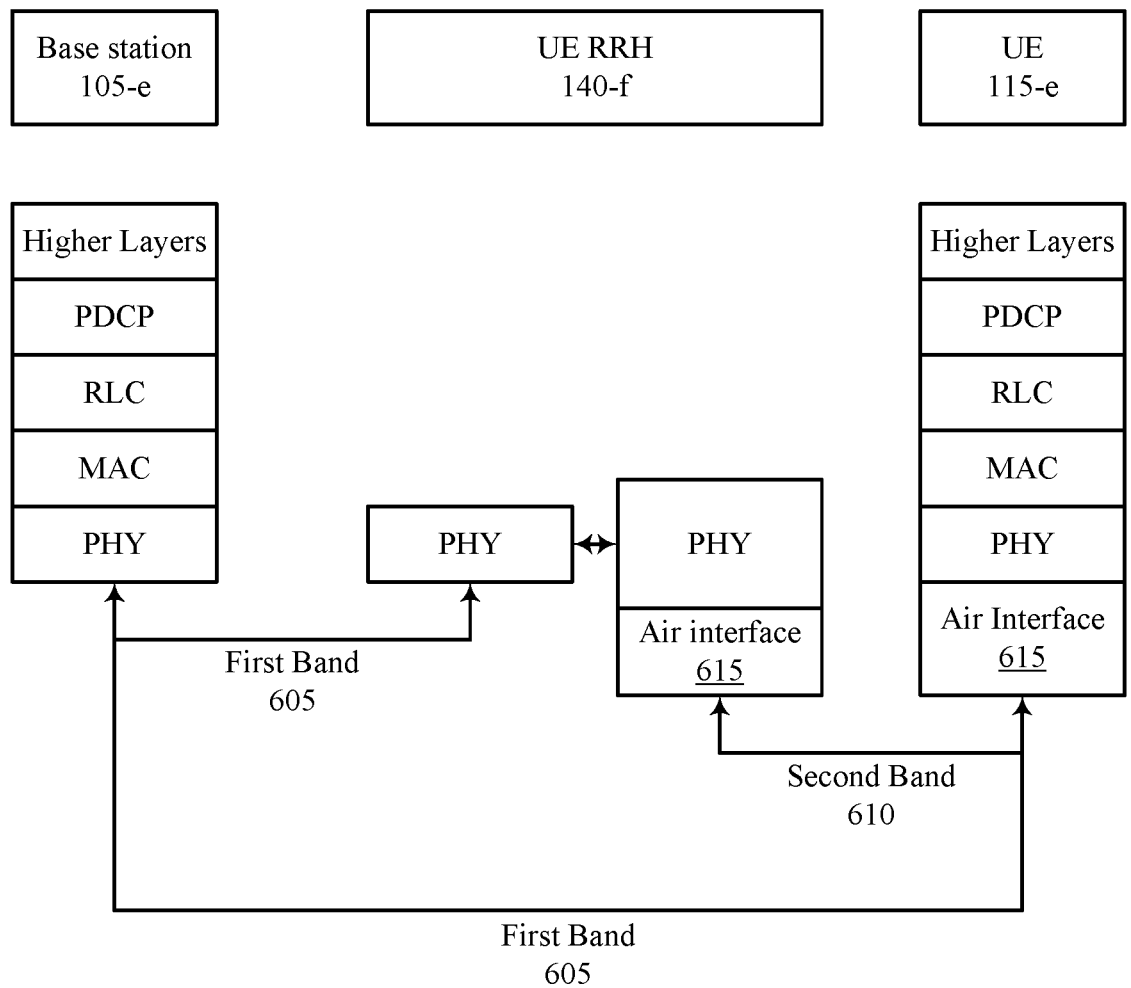
FIG. 6 illustrates an example of a protocol architecture that supports UE capability signaling techniques for wireless communications systems with relays in accordance with aspects of the present disclosure.

FIG. 6 illustrates an example of a protocol architecture 600 that supports UE capability signaling techniques for wireless communications systems with relays in accordance with aspects of the present disclosure. In some examples, protocol architecture 600 may implement aspects of wireless communications system 100, 200, or 300. In this example, protocol architecture 600 may support direct communications between base station 105-*e* and UE 115-*e* and indirect communications between base station 105-*e* and UE 115-*e* via UE RRH 140-*f* (e.g., a layer 1 relay node) in accordance with one or more aspects of the present disclosure.

For a downlink transmission, UE 115-*e* may receive a first subset of downlink signals from base station 105-*e* directly on a first band 605 and a second subset of downlink signals from base station 105-*e* indirectly on a second band 610 (e.g., from UE RRH 140-*f*). UE RRH 140-*f* may receive PHY layer downlink signals on a first band 605 from base station 105-*e*, and the UE RRH 140-*f* may forward at least a subset of the downlink signals on a second band 610 over an air interface 615 to UE 115-*e*. The air interface 615 may be an example of a Wi-Fi air interface or an NR mmW or shared spectrum air interface.

In one example, UE RRH 140-*f* may receive control information from UE 115-*e* on the second band 610 over the air interface 615 to use for processing the downlink signals, and UE RRH 140-*f* may process the downlink signals and may forward relevant information (e.g., decoded transport blocks) to UE 115-*e*. For an uplink transmission, UE 115-*e* may transmit a first subset of uplink signals to base station 105-*e* directly on a first band 605 and a second subset of uplink signals to base station 105-*e* indirectly (e.g., through UE RRH 140-*f*). For the indirect transmission to base station 105-*e*, UE 115-*e* may transmit PHY layer uplink signals to UE RRH 140-f on a second band 610, and UE RRH 140-f may forward the PHY layer uplink signals to base station 105-e on a first band 605.

As can be seen in the exemplary architecture, the MAC layer and above is end to end, direct base station 105-e to UE 115-e. Further, in some cases, certain parts of the physical layer may be end to end direct communications, and the UE RRH 140-f may perform part or most of the PHY layer processing for relayed communications. In some cases, the base station 105-e may be unaware of the presence of the UE RRH 140-f, and may communicate using the first band 605 based on a capability reported by the UE 115-e. Further, in some cases, the UE 115-e to UE RRH 140-f association may be network independent, and thus a network upgrade of an operator of a network may be unnecessary to implement various aspects of the present disclosure.

Figure 7:
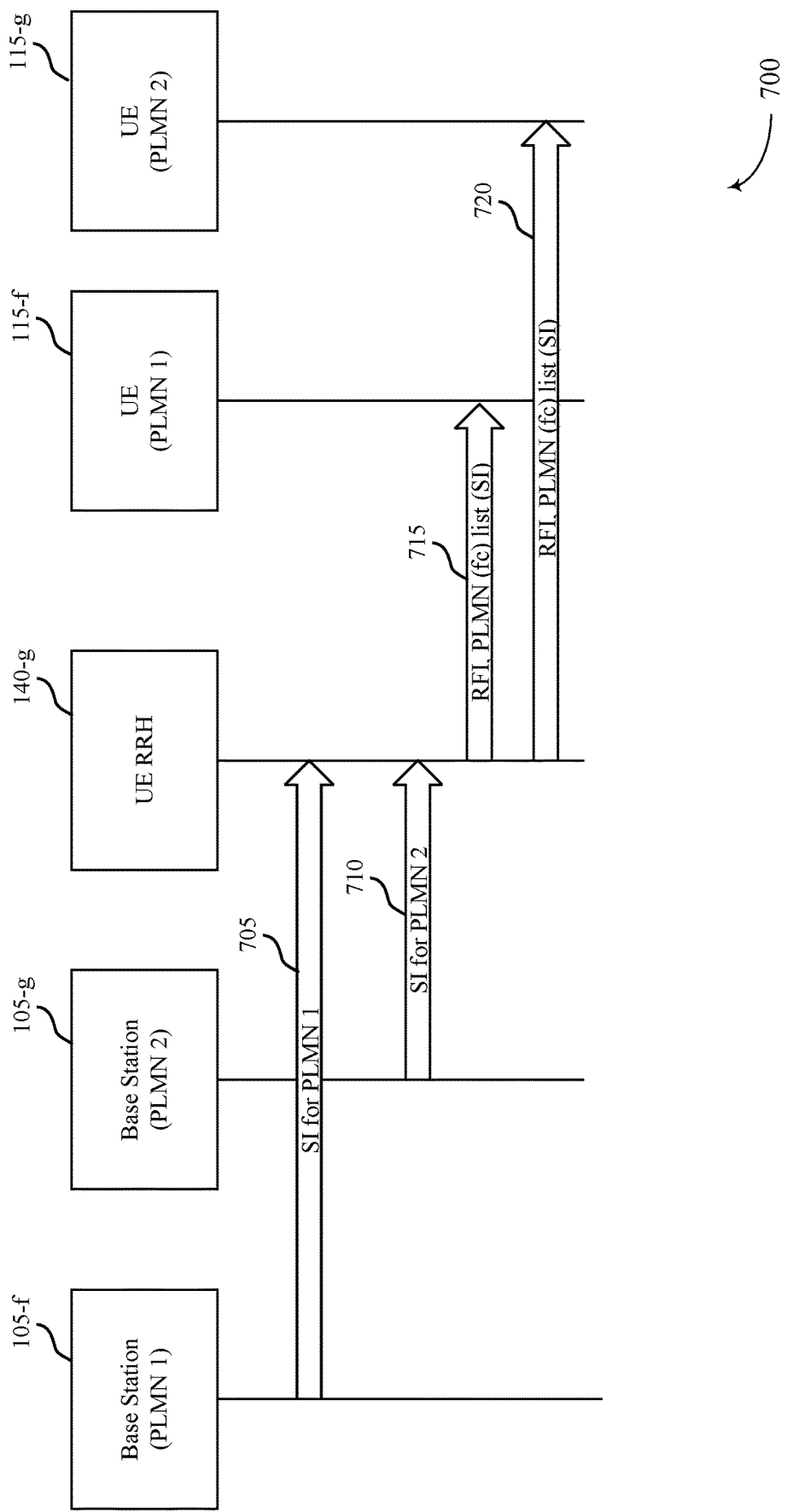
FIG. 7 illustrates an example of a process flow that supports UE capability signaling techniques for wireless communications systems with relays in accordance with aspects of the present disclosure.

FIG. 7 illustrates an example of a process flow 700 for an autonomous UE RRH discovery procedure that supports UE capability signaling techniques for wireless communications systems with relays in accordance with aspects of the present disclosure. In some examples, process flow 700 may implement aspects of wireless communications system 100, 200, or 300. In this example, a UE RRH 140-g may support multiple UEs 115 and base stations 105 that may operate on different public land mobile networks (PLMNs). In the example of FIG. 7, a first base station 105-f may communicate with a first UE 115-f via UE RRH 140-g on a first PLMN. Likewise, a second base station 105-g may communicate with a second UE 115-g via UE RRH 140-g on a second PLMN.

The system in this example, may support autonomous UE RRH discovery, where the UE RRH 140-g may receive system information from each of the base stations 105. For example, at 705, the UE RRH 140-g may receive system information (SI) for the first PLMN from the first base station 105-f. Further, at 710, the UE RRH 140-g may receive system information (SI) for the second PLMN from the second base station 105-g.

The UE RRH 140-g may transmit information, such as in broadcast transmissions to any UEs that are within a coverage area of the UE RRH 140-g, that may allow the UEs to identify the UE RRH 140-g. In this example the UE RRH 140d may transmit discovery information that may include, for example, a RRH function indictor (RFI), a cell ID, PLMN information, SI, an associated carrier frequency ($f_c$), or combinations thereof. In the example of FIG. 7, at 715, the first UE 115-f may receive the discovery information transmitted by the UE RRH 140-g and identify one or more parameters for transmissions based on the discovery information. In some cases, the discovery information also includes information for UE RRH 140-g communications to the base stations 105 (e.g., a number of antennas for FR1 communications at the UE RRH 140-g). The second UE 115-g, at 720, may also receive discovery information transmitted by the UE RRH 140-g. In some cases, the UEs 115 may use the discovery information to determine that communications via the UE RRH 140-g are available, and may configure a UE capability indication that indicates transmission parameters for communications with the UE RRH 140-g. The UE capability indication may be transmitted to the associated base station 105, which may then communicate with the associated UE 115 based on the indicated UE capability, in accordance with techniques such as discussed herein.

Figure 8:
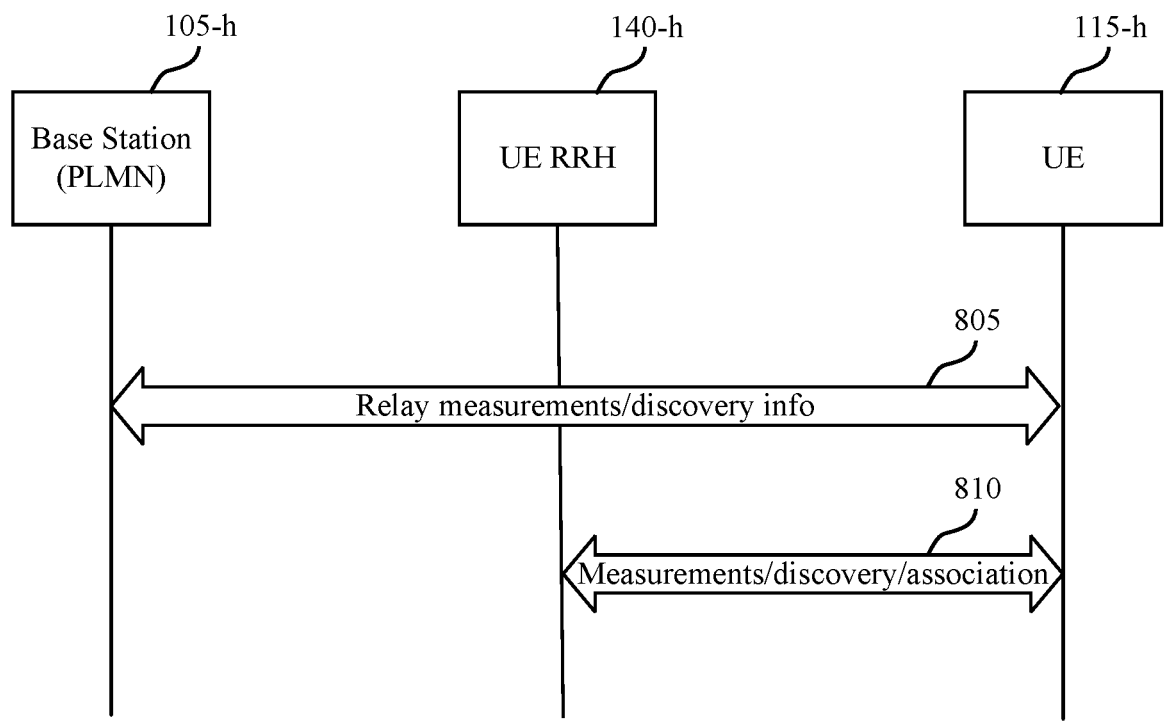
FIG. 8 illustrates an example of a process flow that supports UE capability signaling techniques for wireless communications systems with relays in accordance with aspects of the present disclosure.

FIG. 8 illustrates an example of a process flow 800 for network-assisted UE RRH discovery that supports UE capability signaling techniques for wireless communications systems with relays in accordance with aspects of the present disclosure. In some examples, process flow 800 may implement aspects of wireless communications system 100, 200, or 300. In this example, a first base station 105-h may communicate with a UE 115-h via UE RRH 140-h.

In this example, the network may provide information related to relayed communications via UE RRH 140-h. For example, the base station 105-h may receive configuration information associated with UE RRH 140-h, such as for example, a RRH function indictor (RFI), an associated carrier frequency ($f_c$), and the like. The base station 105-h, at 805, may transmit information associated with the UE RRH 140-h to the UE 115-h. In some cases, the information may include relay measurements and discovery information which may be used to configure the UE 115-h to search for UE RRH 140-h.

The UE 115-h may monitor for signals from the UE RRH 140-h. Based on the monitored signals, the UE 115-h and UE RRH 140-h may, at 810, make one or more measurements and exchange discovery information to establish an association. In some cases, the UEs 115-h may use the discovery information to determine that communications via the UE RRH 140-g are available. In some cases, the base station 105-h may not be involved in UE RRH 140-h to UE 115-h association process. In some cases, the UE 115-h may configure a UE capability indication that indicates transmission parameters for communications with the UE RRH 140-h. The UE capability indication may be transmitted to the base station 105-h, which may then communicate with the UE 115-h via the UE RRH 140-h based on the indicated UE capability, in accordance with techniques such as discussed herein.

Figure 9:
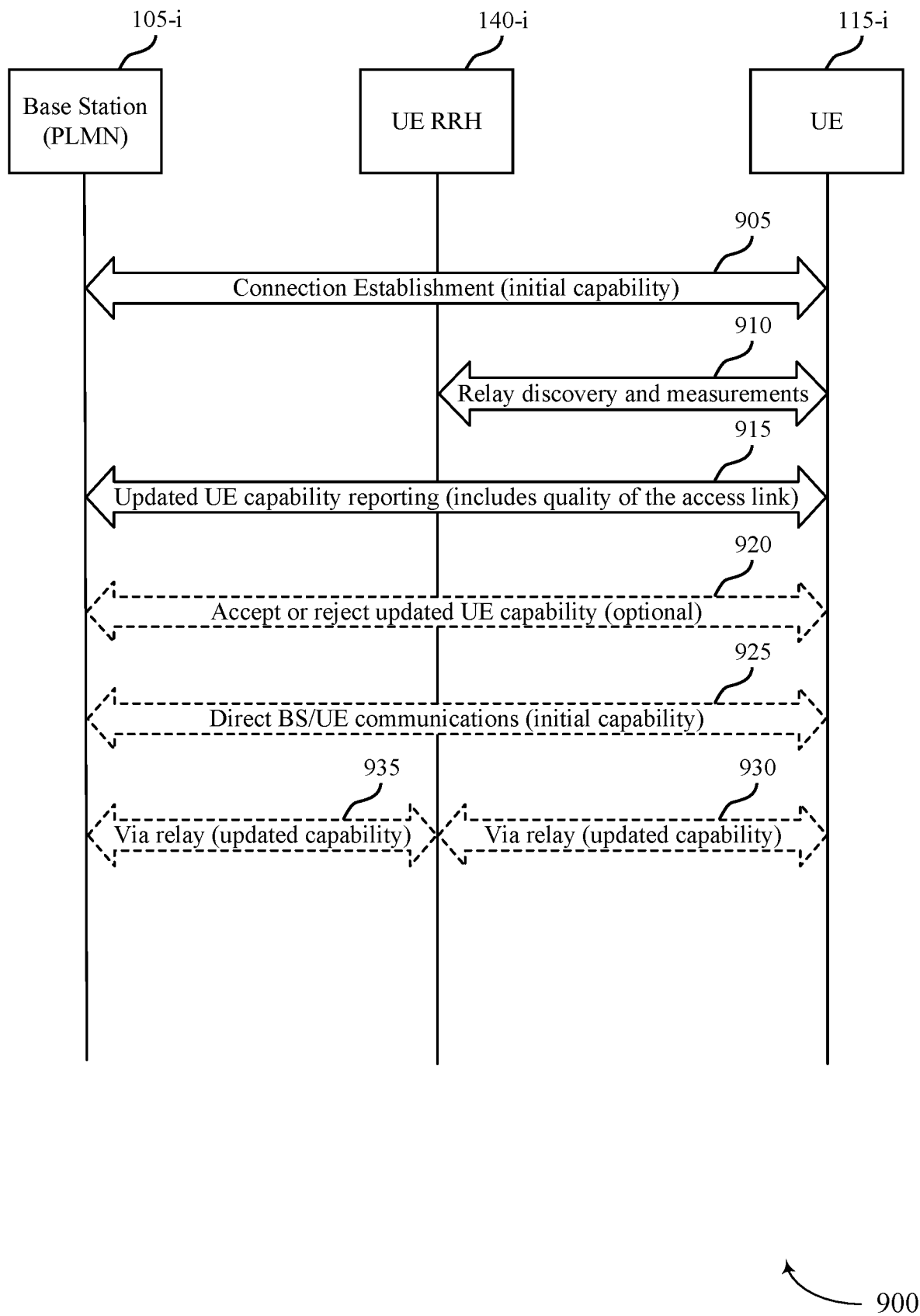
FIG. 9 illustrates an example of a process flow that supports UE capability signaling techniques for wireless communications systems with relays in accordance with aspects of the present disclosure.

FIG. 9 illustrates an example of a process flow 900 that supports UE capability signaling techniques for wireless communications systems with relays in accordance with aspects of the present disclosure. In some examples, process flow 900 may implement aspects of wireless communications systems 100, 200, or 300. In this example, a base station 105-i may communicate with a UE 115-i via UE RRH 140-i.

At 905, the base station 105-i and UE 115-i may establish a connection. In some cases, the connection may be a direct connection based on an initial UE 115-i capability, on a first frequency band (e.g., FR1). At 910, the UE 115-i and UE RRH 140-i may perform relay discovery and measurements, and the UE 115-i may associate with the UE RRH 140-i. In some cases, the relay discovery may include determination of one or more transmission parameters associated with the UE RRH 140-i that are used by the UE RRH 140-i for communications on the first frequency band (e.g., a number of antennas at the UE RRH 140-i that are used for communications on the first frequency band, access link quality associated with the UE RRH 140-i, and the like).

At 915, the UE 115-i may signal an updated UE capability to the base station 105-i. In some cases, two or more UE RRHs 140 may be identified by the UE 115-i, and the UE capability may include information for each UE RRH, and in some cases may provide information that may be used for CoMP communications via multiple UE RRHs 140. In some cases, the UE 115-i may simply report an updated capability to the base station 105-i which may use the updated capability for communications with the UE 115-i via the UE RRH 140-i. In such cases, the presence of UE RRH 140-i may be transparent to the base station 105-i. The UE 115-i capability indication may include parameters for base station 105-i communications via the UE RRH 140-i, such as, for example, a number of antennas at the UE RRH 140-i, a maximum supportable rate, an updated HARQ or downlinkto-uplink grant timeline (e.g., updated values for K0, dl-DataToUL-ACK, K2, or combinations thereof, for 5G NR communications),and/or quality of service (QoS) parameters (e.g., updated values for latency, error rate, jitter, or combinations thereof).

Optionally, at 920, the base station 105-$i$ may accept or reject the updated UE capability. In such cases, updated UE capability may implicitly or explicitly indicate that communications are via the UE RRH 140-$i$, and the base station 105-$i$ may determine whether relayed communications are to be used with the UE 115-$i$. In some cases, the base station may make such a determination based on, for example, a quality of service associated with communications with the UE 115-$i$ (e.g., the presence of ultra-reliable or low latency communications may prompt the base station 105-$i$ to reject relayed communications).

At 925, in cases where the base station 105-$i$ rejects the updated UE 115-$i$ capability, the UE 115-$i$ and base station 105-$i$ may use direct communications on the first frequency band. Alternatively, at 930, in cases where the base station 105-$i$ accepts the updated UE 115-$i$ capability, the UE 115-$i$ may communicate with the UE RRH 140-$i$ on a second frequency band (e.g., FR2), and the UE RRH 140-$i$ may relay such communications to/from the base station 105-$i$ on the first frequency band at 935.

Figure 10:
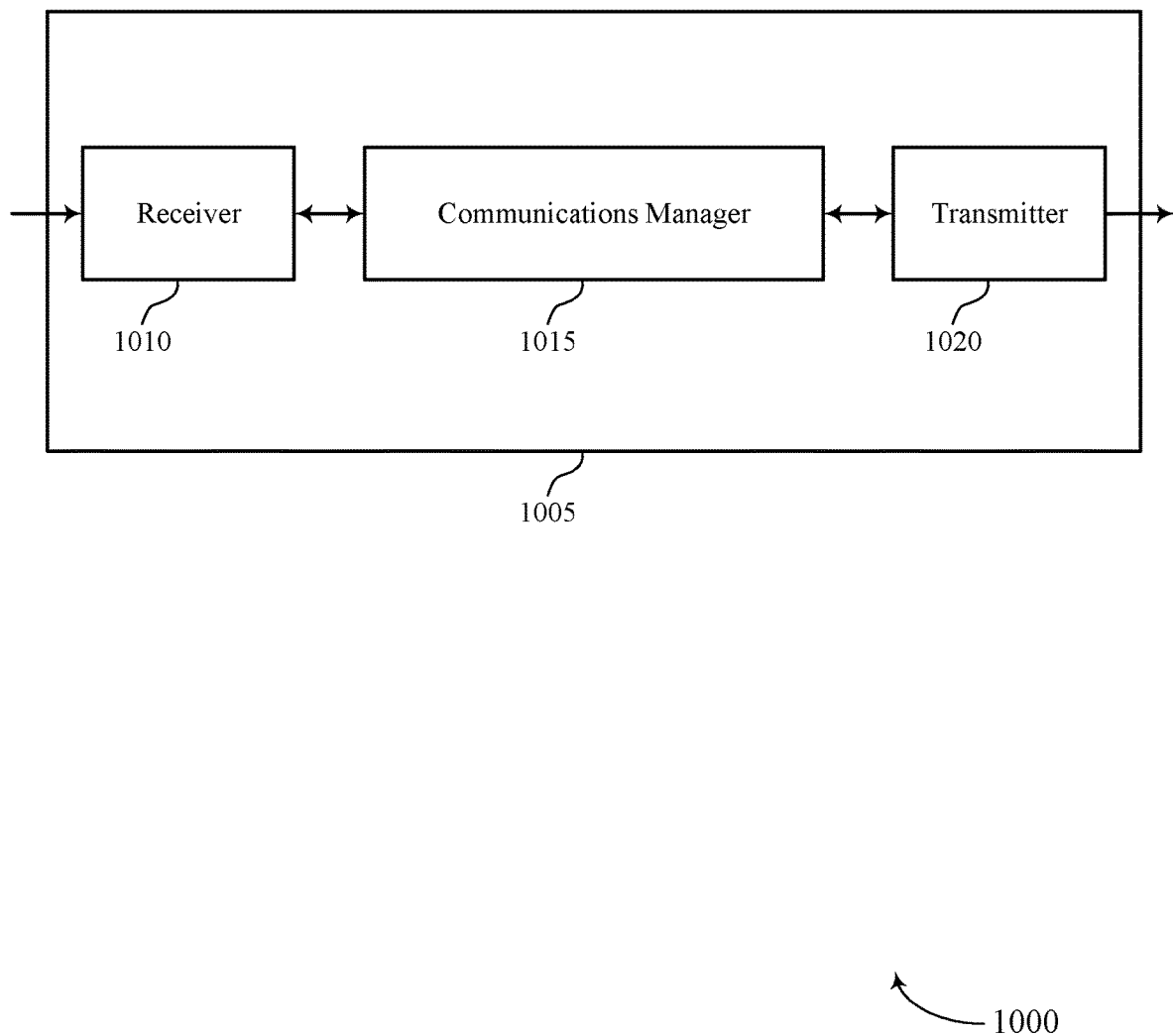
FIGS. 10 and 11 show block diagrams of devices that support UE capability signaling techniques for wireless communications systems with relays in accordance with aspects of the present disclosure.

FIG. 10 shows a block diagram 1000 of a device 1005 that supports UE capability signaling techniques for wireless communications systems with relays in accordance with aspects of the present disclosure. The device 1005 may be an example of aspects of a UE 115 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to UE capability signaling techniques for wireless communications systems with relays, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may establish a connection with a base station according to a first UE capability, where the first UE capability indicates a first set of connection parameters, determine a second set of connection parameters for communications with the base station via a first relay, communicate with the base station via the first relay according to the second UE capability, and transmit a UE capability message to the base station, where the UE capability message indicates a second UE capability for communications with the second set of connection parameters. In some cases, transmissions based on the first UE capability may be on a first frequency band, and transmissions based on the second UE capability between the UE and the first relay are on a second frequency band and transmissions between the base station and the first relay are on the first frequency band.

The communications manager 1015 may be an example of aspects of the communications manager 1310 described herein.

The communications manager 1015 may as described herein be implemented to realize one or more potential advantages. One implementation may allow the device 1005 to communicate using higher data rates, with higher reliability, or combinations thereof, which may provide enhanced efficiency and reduced latency communications. Further, implementations may allow the device 1005 to enhance reliability of communications, increase throughput, and enhance user experience, while reducing power consumption associated with retransmissions, among other advantages.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
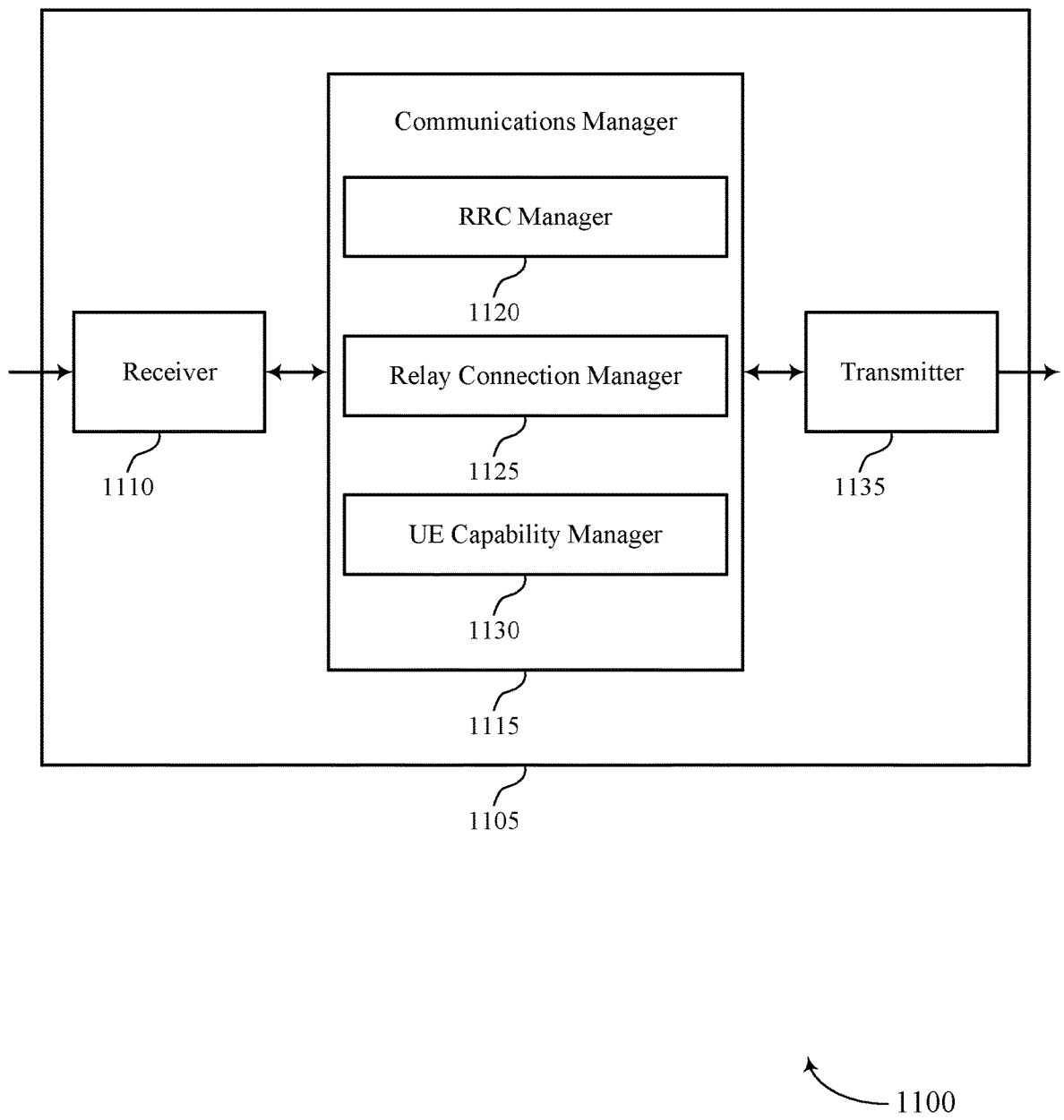

FIG. 11 shows a block diagram 1100 of a device 1105 that supports UE capability signaling techniques for wireless communications systems with relays in accordance with aspects of the present disclosure. The device 1105 may be an example of aspects of a device 1005, or a UE 115 as described herein. The device 1105 may include a receiver 1110, a communications manager 1115, and a transmitter 1135. The device 1105 may also include a processor. Each of these components may be in communication with one another (e.g., via one or more buses).

The receiver 1110 may receive information such as packets, user data, or control information associated with various information channels (e.g., control channels, data channels, and information related to UE capability signaling techniques for wireless communications systems with relays, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a RRC manager 1120, a relay connection manager 1125, and an UE capability manager 1130. The communications manager 1115 may be an example of aspects of the communications manager 1310 described herein.

The RRC manager 1120 may establish a connection with a base station according to a first UE capability, where the first UE capability indicates a first set of connection parameters. In some cases, the connection with the base station may use a first frequency band.

The relay connection manager 1125 may determine a second set of connection parameters for communications with the base station via a first relay. The relay connection manager 1125 may manage communications with the base station via the first relay according to the second UE capability. In some cases, transmissions between the UE and the first relay are on a second frequency band and transmissions between the base station and the first relay are on the first frequency band.

The UE capability manager 1130 may transmit a UE capability message to the base station, where the UE capability message indicates a second UE capability for communications with the second set of connection parameters.

The transmitter 1135 may transmit signals generated by other components of the device 1105. In some examples, the transmitter 1135 may be collocated with a receiver 1110 in a transceiver module. For example, the transmitter 1135 may be an example of aspects of the transceiver 1320 described with reference to FIG. 13. The transmitter 1135 may utilize a single antenna or a set of antennas.

Figure 12:
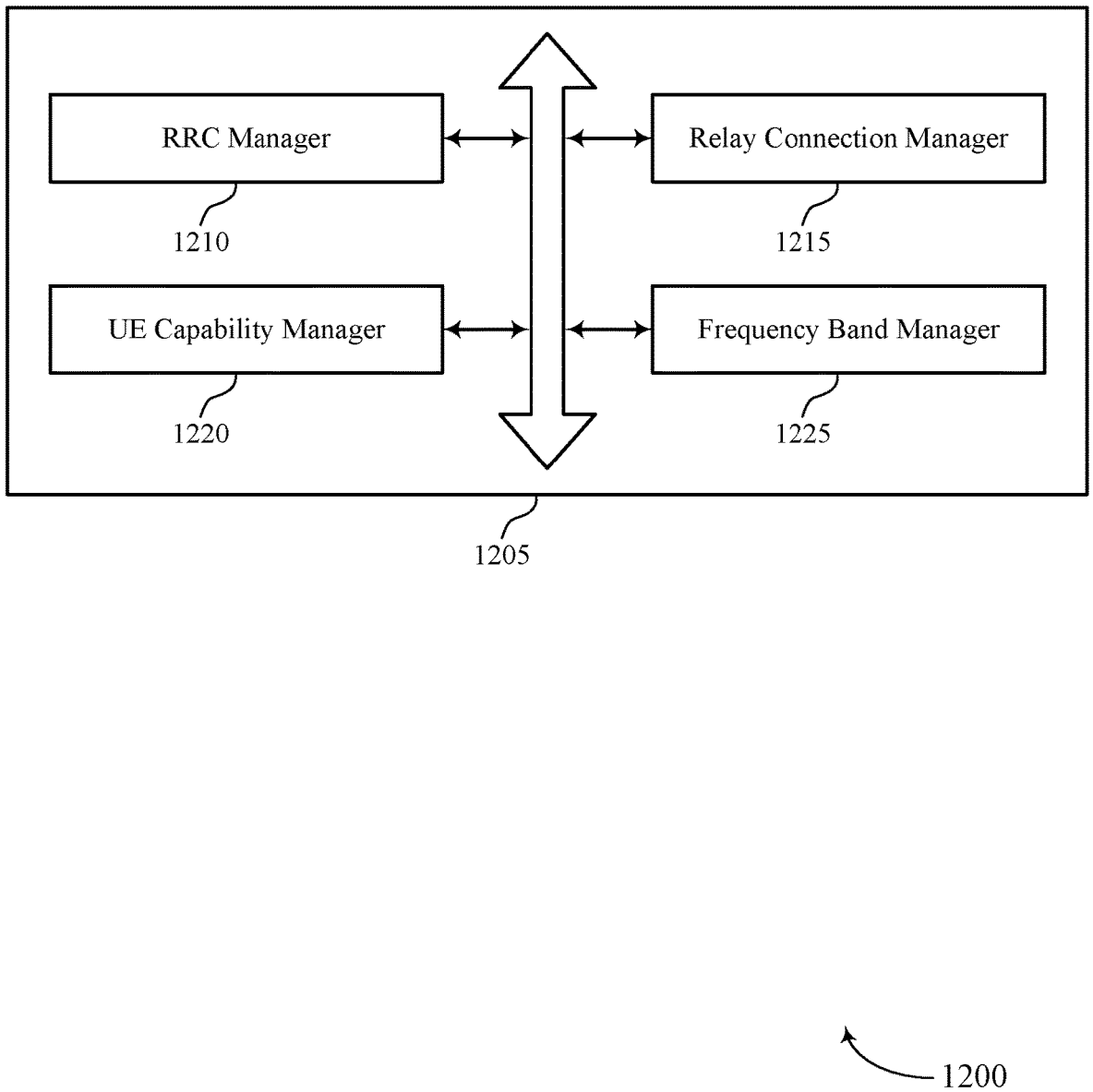
FIG. 12 shows a block diagram of a communications manager that supports UE capability signaling techniques for wireless communications systems with relays in accordance with aspects of the present disclosure.

FIG. 12 shows a block diagram 1200 of a communications manager 1205 that supports UE capability signaling techniques for wireless communications systems with relays in accordance with aspects of the present disclosure. The communications manager 1205 may be an example of aspects of a communications manager 1015, a communications manager 1115, or a communications manager 1310 described herein. The communications manager 1205 may include a RRC manager 1210, a relay connection manager 1215, an UE capability manager 1220, and a frequency band manager 1225. Each of these modules may communicate, directly or indirectly, with one another (e.g., via one or more buses).

The RRC manager 1210 may establish a connection with a base station according to a first UE capability, where the first UE capability indicates a first set of connection parameters. In some cases, the connection with the base station may use a first frequency band.

The relay connection manager 1215 may determine a second set of connection parameters for communications with the base station via a first relay. In some examples, the relay connection manager 1215 may manage communications with the base station via the first relay according to the second UE capability. In some cases, transmissions between the UE and the first relay are on the second frequency band and transmissions between the base station and the first relay are on the first frequency band.

In some cases, the second set of connection parameters include one or more of a number of antennas available for communications, a maximum supportable data rate associated with communications via the first relay, an acknowledgment timeline for communicating acknowledgment feedback between the UE and the base station, a downlink-to-uplink grant timeline between the UE receiving a grant and transmitting a responsive uplink transmission, a feedback processing timeline, one or more quality of service parameters, or any combinations thereof. In some cases, the number of antennas available for communications correspond to the number of antennas at the first relay available for communications on the first frequency band, and where the number of antennas at the first relay is greater than a number of antennas at the UE that are available for communications on the first frequency band. In some cases, the one or more quality of service parameters include one or more of a latency parameter, an error rate parameter, a jitter parameter, or any combinations thereof.

In some examples, the relay connection manager 1215 may determine a third set of connection parameters for communications with the base station via a second relay using the second frequency band. In some cases, the communicating with the base station is via both the first relay and the second relay according to the second UE capability. In some cases, the first relay includes a layer 1 relay between the base station and the UE. In some cases, the first relay performs at least a portion of physical layer processing of traffic that is transmitted between the UE and the base station.

The UE capability manager 1220 may transmit a UE capability message to the base station, where the UE capability message indicates a second UE capability for communications with the second set of connection parameters. In some examples, the UE capability manager 1220 may receive, responsive to the transmitting the UE capability message, a transmission from the base station to enable the second UE capability, and where the communicating with the base station via the first relay is performed responsive to the transmission from the base station to enable the second UE capability.

In some examples, the UE capability manager 1220 may transmit a second UE capability message to the base station, where the second UE capability message indicates the third set of connection parameters. In some examples, the UE capability manager 1220 may receive, responsive to the transmitting the first UE capability message and the second UE capability message, a transmission from the base station to enable the second UE capability, and where the communicating with the base station via the first relay is performed responsive to the transmission from the base station to enable the second UE capability. In some examples, the UE capability message indicates the second set of connection parameters that are associated with the first relay and indicates the third set of connection parameters that are associated with the second relay.

The frequency band manager 1225 may configure communications on one or more available frequency bands, such as on FR1 or FR2. In some cases, the UE is configured to communicate with the base station on the first frequency band using a first set of antennas, and the UE is configured to communicate with the first relay on the second frequency band using a second set of antennas that is different than the first set of antennas. In some cases, the first frequency band is a sub 7 gigahertz frequency band and the second frequency band is a millimeter wave frequency band. In some cases, the first frequency band is a sub 7 gigahertz frequency band and the second frequency band is a shared radio frequency spectrum band.

Figure 13:
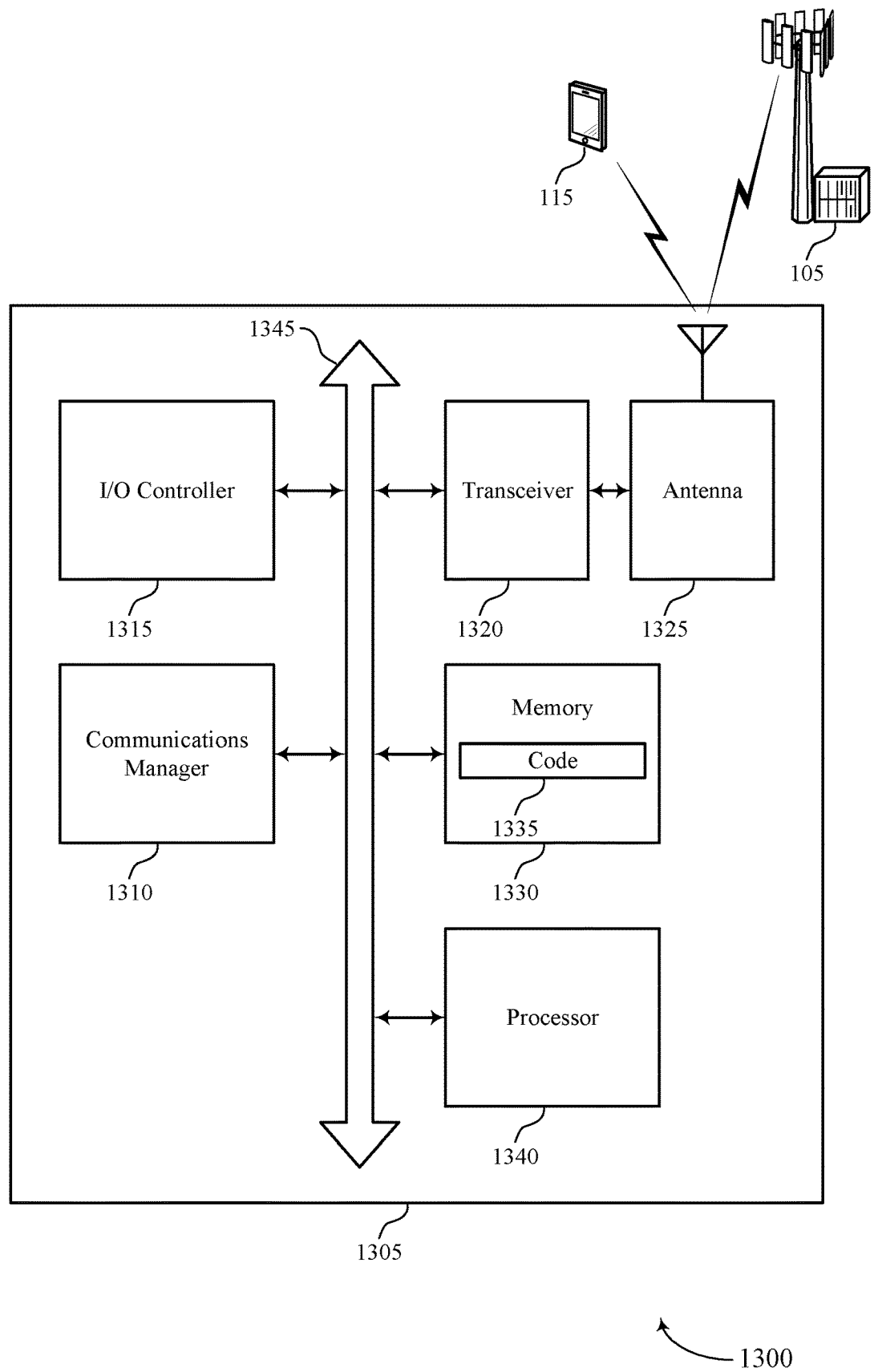
FIG. 13 shows a diagram of a system including a device that supports UE capability signaling techniques for wireless communications systems with relays in accordance with aspects of the present disclosure.

FIG. 13 shows a diagram of a system 1300 including a device 1305 that supports UE capability signaling techniques for wireless communications systems with relays in accordance with aspects of the present disclosure. The device 1305 may be an example of or include the components of device 1005, device 1105, or a UE 115 as described herein. The device 1305 may include components for bi-directional voice and data communications including components for transmitting and receiving communications, including a communications manager 1310, an I/O controller 1315, a transceiver 1320, an antenna 1325, memory 1330, and a processor 1340. These components may be in electronic communication via one or more buses (e.g., bus 1345).

The communications manager 1310 may establish a connection with a base station according to a first UE capability, where the first UE capability indicates a first set of connection parameters, determine a second set of connection parameters for communications with the base station via a first relay, communicate with the base station via the first relay according to the second UE capability, and transmit a UE capability message to the base station, where the UE capability message indicates a second UE capability for communications with the second set of connection parameters. In some cases, transmissions between the UE and the first relay are on a second frequency band and transmissions between the base station and the first relay are on a first frequency band.

The communications manager 1310 may as described herein be implemented to realize one or more potential advantages. One implementation may allow the device 1305 to communicate using higher data rates, with higher reliability, or combinations thereof, which may provide enhanced efficiency and reduced latency communications. Further, implementations may allow the device 1305 to enhance reliability of communications, increase throughput, and enhance user experience, while reducing power consumption associated with retransmissions, among other advantages.

The I/O controller 1315 may manage input and output signals for the device 1305. The I/O controller 1315 may also manage peripherals not integrated into the device 1305. In some cases, the I/O controller 1315 may represent a physical connection or port to an external peripheral. In some cases, the I/O controller 1315 may utilize an operating system such as iOS®, ANDROID®, MS-DOS®, MS-WINDOWS®, OS/2®, UNIX®, LINUX®, or another known operating system. In other cases, the I/O controller 1315 may represent or interact with a modem, a keyboard, a mouse, a touchscreen, or a similar device. In some cases, the I/O controller 1315 may be implemented as part of a processor. In some cases, a user may interact with the device 1305 via the I/O controller 1315 or via hardware components controlled by the I/O controller 1315.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM and ROM. The memory 1330 may store computer-readable, computer-executable code 1335 including instructions that, when executed, cause the processor to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting UE capability signaling techniques for wireless communications systems with relays).

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
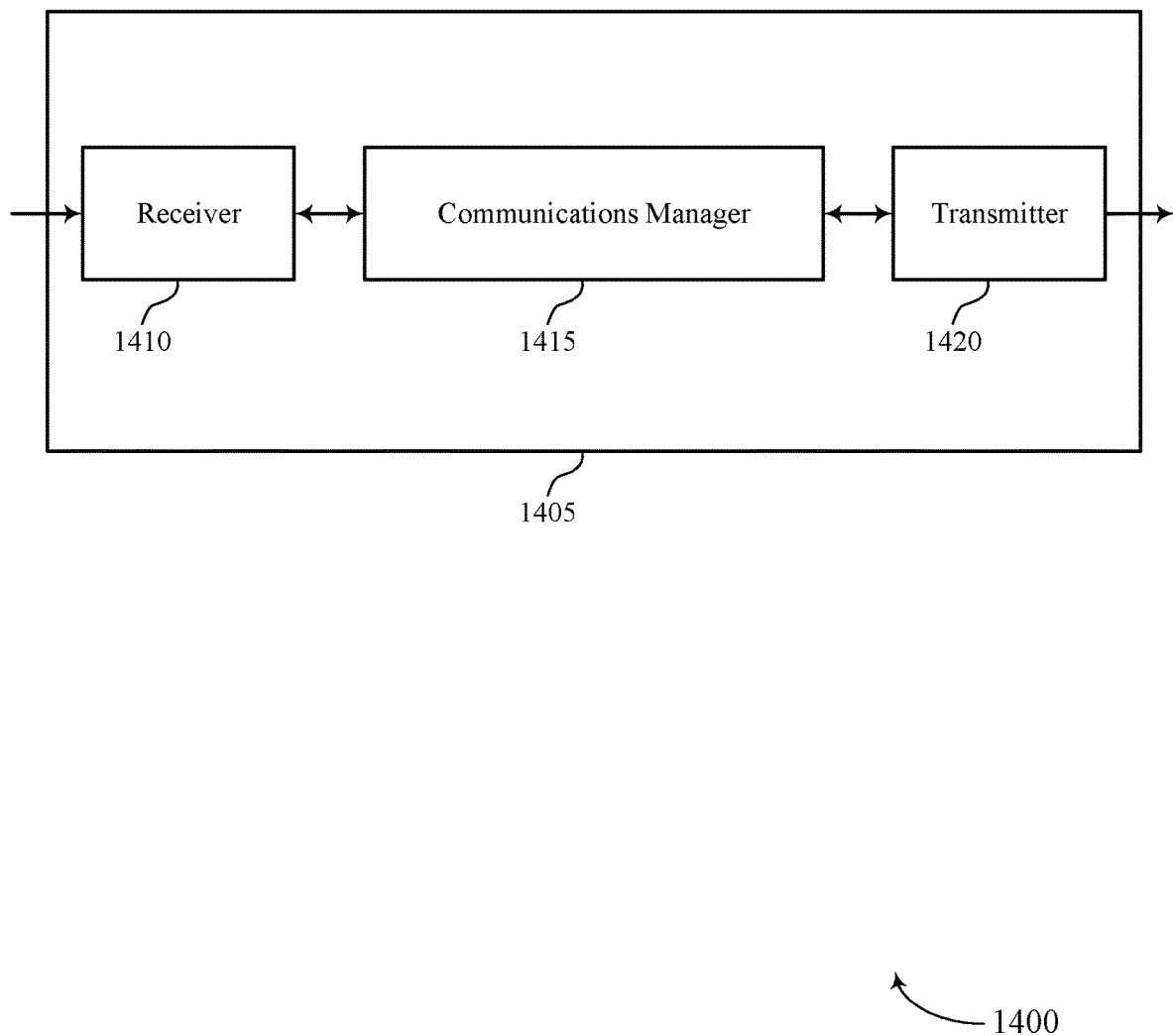
FIGS. 14 and 15 show block diagrams of devices that support UE capability signaling techniques for wireless communications systems with relays in accordance with aspects of the present disclosure.

FIG. 14 shows a block diagram 1400 of a device 1405 that supports UE capability signaling techniques for wireless communications systems with relays in accordance with aspects of the present disclosure. The device 1405 may be an example of aspects of a base station 105 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to UE capability signaling techniques for wireless communications systems with relays, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may establish a connection with a UE according to a first UE capability, where the first UE capability indicates a first set of connection parameters for communications with the UE, receive, from the UE, a UE capability message that indicates a second UE capability and a second set of connection parameters, where the second set of connection parameters are associated with a first relay identified by the UE for communications with the base station, and communicate with the UE via the first relay according to the second UE capability. In some cases transmissions between the UE and the first relay are on a second frequency band and transmissions between the base station and the first relay are on a first frequency band. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

Figure 15:
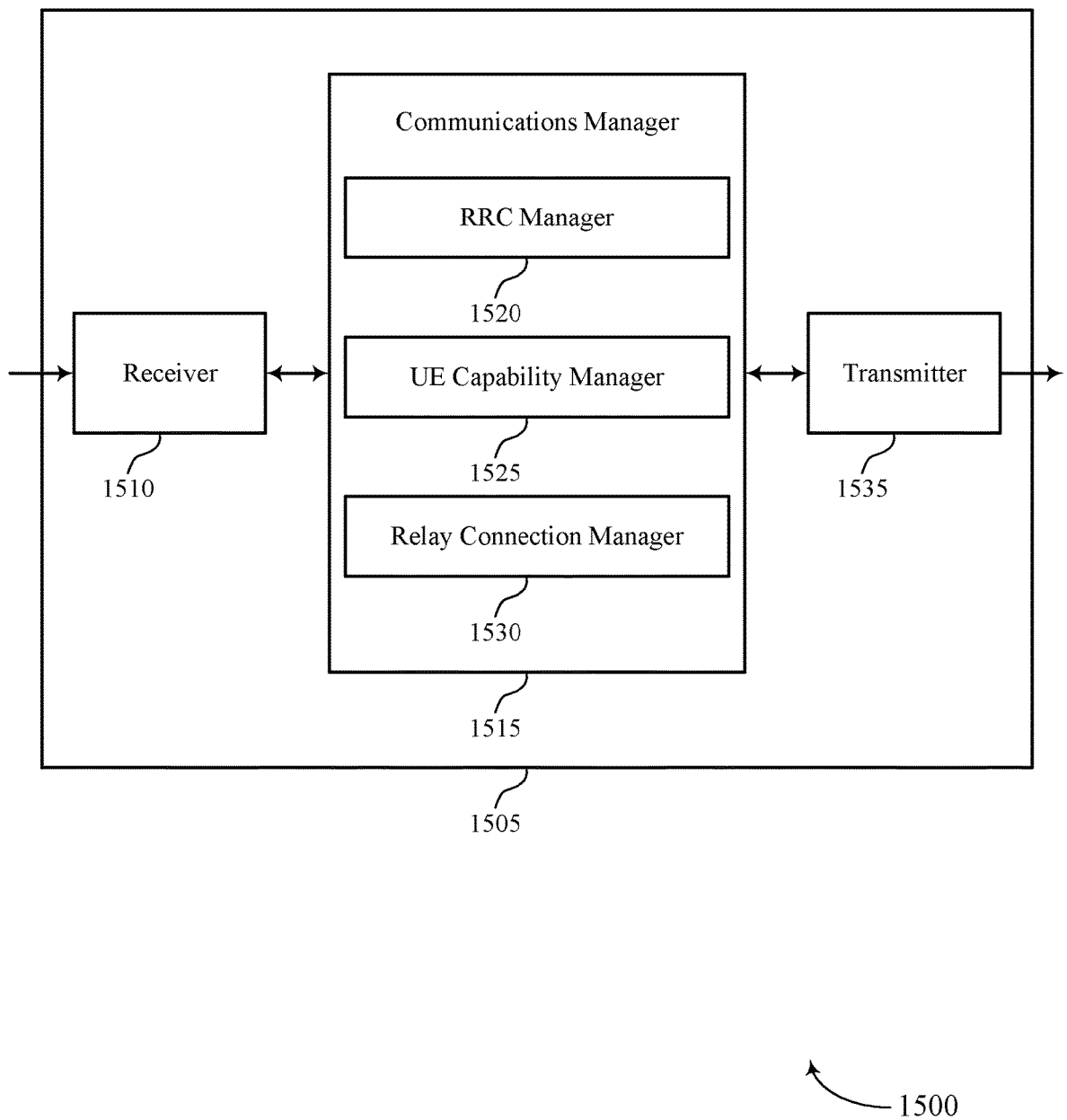

FIG. 15 shows a block diagram 1500 of a device 1505 that supports UE capability signaling techniques for wireless communications systems with relays in accordance with aspects of the present disclosure. The device 1505 may be an example of aspects of a device 1405, or a base station 105 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to UE capability signaling techniques for wireless communications systems with relays, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a RRC manager 1520, an UE capability manager 1525, and a relay connection manager 1530. The communications manager 1515 may be an example of aspects of the communications manager 1710 described herein.

The RRC manager 1520 may establish a connection with a UE according to a first UE capability, where the first UE capability indicates a first set of connection parameters for communications with the UE. In some cases, the connection with the UE may use a first frequency band.

The UE capability manager 1525 may receive, from the UE, a UE capability message that indicates a second UE capability and a second set of connection parameters, where the second set of connection parameters are associated with a first relay identified by the UE for communications with the base station.

The relay connection manager 1530 may communicate with the UE via the first relay according to the second UE capability. In some cases, transmissions between the UE and the first relay are on a second frequency band and transmissions between the base station and the first relay are on the first frequency band.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
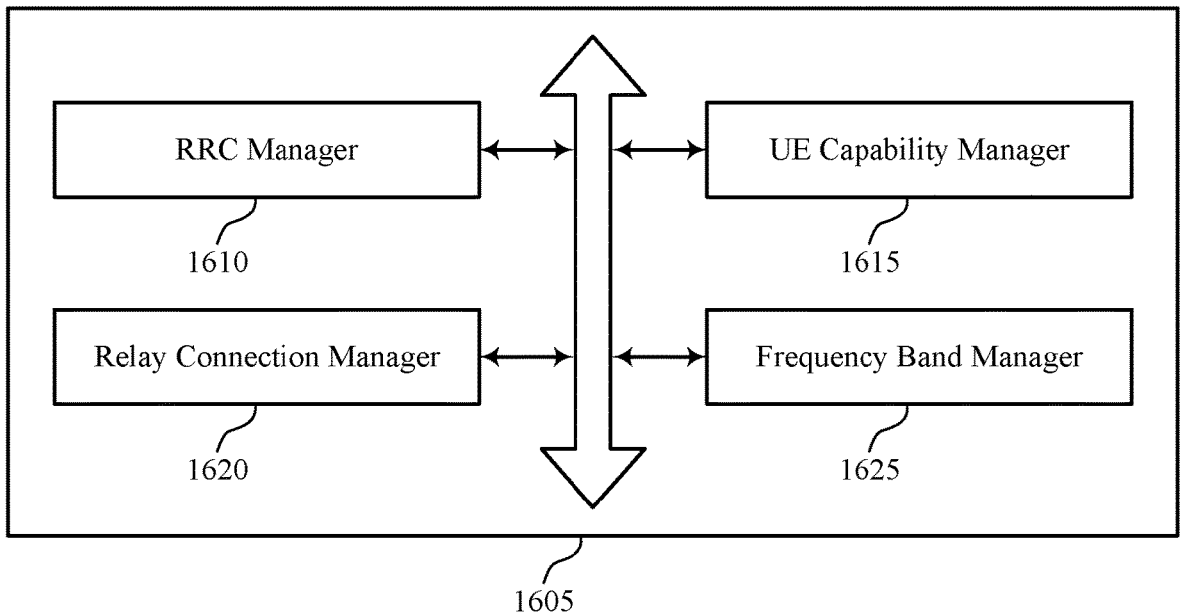
FIG. 16 shows a block diagram of a communications manager that supports UE capability signaling techniques for wireless communications systems with relays in accordance with aspects of the present disclosure.

FIG. 16 shows a block diagram 1600 of a communications manager 1605 that supports UE capability signaling techniques for wireless communications systems with relays in accordance with aspects of the present disclosure. The communications manager 1605 may be an example of aspects of a communications manager 1415, a communications manager 1515, or a communications manager 1710 described herein. The communications manager 1605 may include a RRC manager 1610, an UE capability manager 1615, a relay connection manager 1620, and a frequency band manager 1625. Each of these modules may communicate, directly or indirectly, with one another (e.g., via one or more buses).

The RRC manager 1610 may establish a connection with a UE according to a first UE capability, where the first UE capability indicates a first set of connection parameters for communications with the UE. In some cases, the connection with the UE may use a first frequency band.

The UE capability manager 1615 may receive, from the UE, a UE capability message that indicates a second UE capability and a second set of connection parameters, where the second set of connection parameters are associated with a first relay identified by the UE for communications with the base station. In some examples, the UE capability manager 1615 may determine, responsive to the receiving the UE capability message, that the second UE capability is to be used for communications between the UE and the base station. In some examples, the UE capability manager 1615 may transmit, an indication to the UE to enable the second UE capability.

In some examples, the UE capability manager 1615 may receive a second UE capability message that indicates a third UE capability and a third set of connection parameters. In some examples, the UE capability manager 1615 may select the second UE capability for communications between the UE and the base station, and may transmit an indication to the UE to enable the second UE capability. In some cases, the UE capability message further includes a third set of connection parameters for communications via a second relay.

The relay connection manager 1620 may communicate with the UE via the first relay according to the second UE capability, where transmissions between the UE and the first relay are on a second frequency band and transmissions between the base station and the first relay are on the first frequency band. In some cases, the second set of connection parameters include one or more of a number of antennas available for communications, a maximum supportable data rate associated with communications via the first relay, an acknowledgment timeline for communicating acknowledgment feedback between the UE and the base station, a downlink-to-uplink grant timeline between the UE receiving a grant and transmitting a responsive uplink transmission, a feedback processing timeline, one or more quality of service parameters, or any combinations thereof. In some cases, the number of antennas available for communications correspond to the number of antennas at the first relay available for communications on the first frequency band, and where the number of antennas at the first relay is greater than a number of antennas at the UE that are available for communications on the first frequency band. In some cases, the one or more quality of service parameters include one or more of a latency parameter, an error rate parameter, a jitter parameter, or any combinations thereof.

In some cases, the communicating with the UE is via both the first relay and the second relay according to the second UE capability. In some cases, the first relay includes a layer 1 relay between the base station and the UE. In some cases, the first relay performs at least a portion of physical layer processing of traffic that is transmitted between the UE and the base station.

The frequency band manager 1625 may manage communications or two or more frequency bands (e.g., FR1 and FR2). In some cases, the UE is configured to communicate with the base station on the first frequency band using a first set of antennas, and the UE is configured to communicate with the first relay on the second frequency band using a second set of antennas that is different than the first set of antennas. In some cases, the first frequency band is a sub 7 gigahertz frequency band and the second frequency band is a millimeter wave frequency band. In some cases, the first frequency band is a sub 7 gigahertz frequency band and the second frequency band is a shared radio frequency spectrum band.

Figure 17:
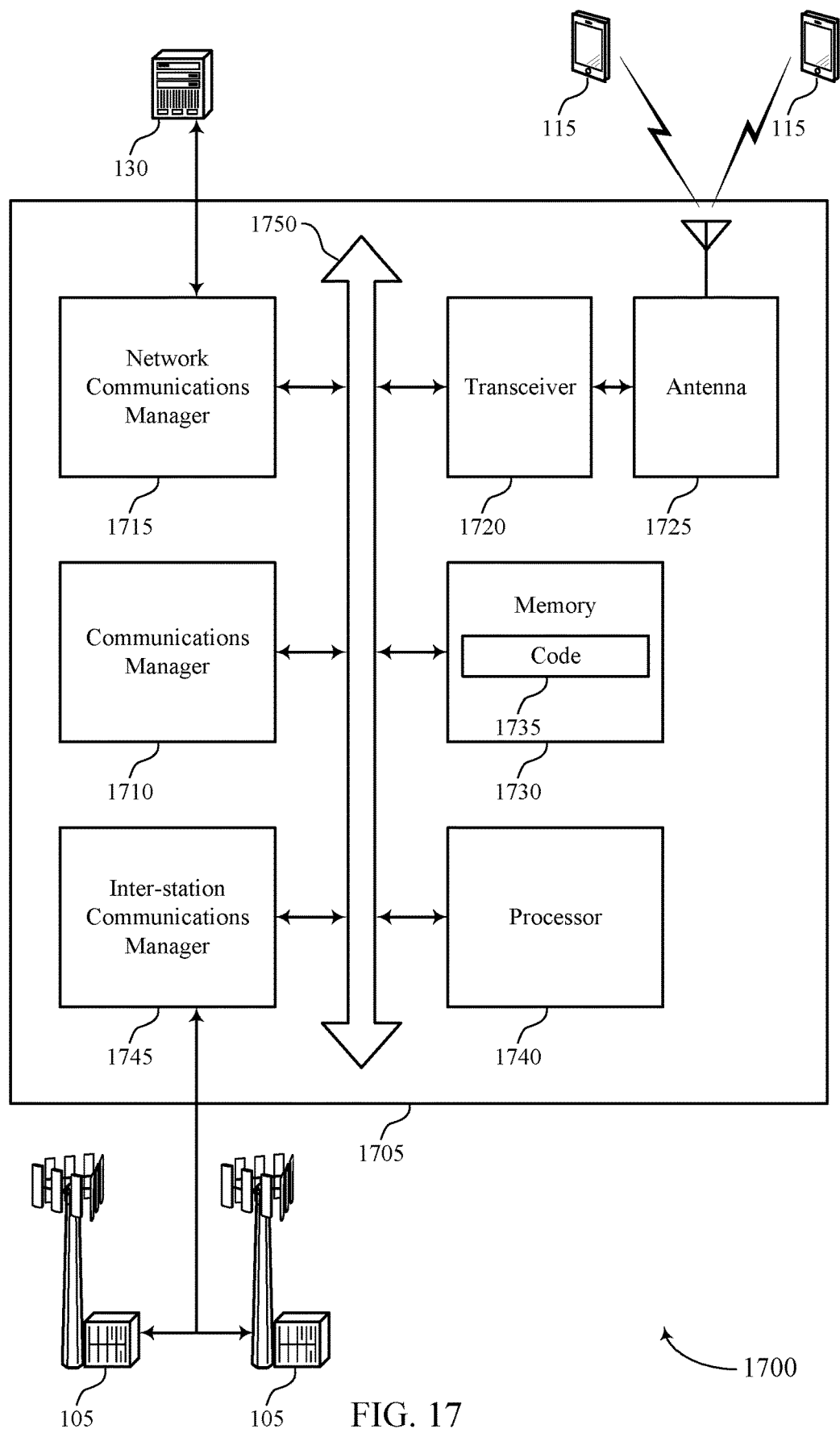
FIG. 17 shows a diagram of a system including a device that supports UE capability signaling techniques for wireless communications systems with relays in accordance with aspects of the present disclosure.

FIG. 17 shows a diagram of a system 1700 including a device 1705 that supports UE capability signaling techniques for wireless communications systems with relays in accordance with aspects of the present disclosure. The device 1705 may be an example of or include the components of device 1405, device 1505, or a base station 105 as described herein. The device 1705 may include components for bi-directional voice and data communications including components for transmitting and receiving communications, including a communications manager 1710, a network communications manager 1715, a transceiver 1720, an antenna 1725, memory 1730, a processor 1740, and an inter-station communications manager 1745. These components may be in electronic communication via one or more buses (e.g., bus 1750).

The communications manager 1710 may establish a connection with a UE according to a first UE capability, where the first UE capability indicates a first set of connection parameters for communications with the UE, receive, from the UE, a UE capability message that indicates a second UE capability and a second set of connection parameters, where the second set of connection parameters are associated with a first relay identified by the UE for communications with the base station, and communicate with the UE via the first relay according to the second UE capability. In some cases, transmissions between the UE and the first relay are on a second frequency band and transmissions between the base station and the first relay are on a first frequency band.

The network communications manager 1715 may manage communications with the core network (e.g., via one or more wired backhaul links). For example, the network communications manager 1715 may manage the transfer of data communications for client devices, such as one or more UEs 115.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include RAM, ROM, or a combination thereof. The memory 1730 may store computer-readable code 1735 including instructions that, when executed by a processor (e.g., the processor 1740) cause the device to perform various functions described herein. In some cases, the memory 1730 may contain, among other things, a BIOS which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In some cases, a memory controller may be integrated into processor 1740. The processor 1740 may be configured to execute computer-readable instructions stored in a memory (e.g., the memory 1730) to cause the device 1705 to perform various functions (e.g., functions or tasks supporting UE capability signaling techniques for wireless communications systems with relays).

The inter-station communications manager 1745 may manage communications with other base station 105, and may include a controller or scheduler for controlling communications with UEs 115 in cooperation with other base stations 105. For example, the inter-station communications manager 1745 may coordinate scheduling for transmissions to UEs 115 for various interference mitigation techniques such as beamforming or joint transmission. In some examples, the inter-station communications manager 1745 may provide an X2 interface within an LTE/LTE-A wireless communication network technology to provide communication between base stations 105.

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
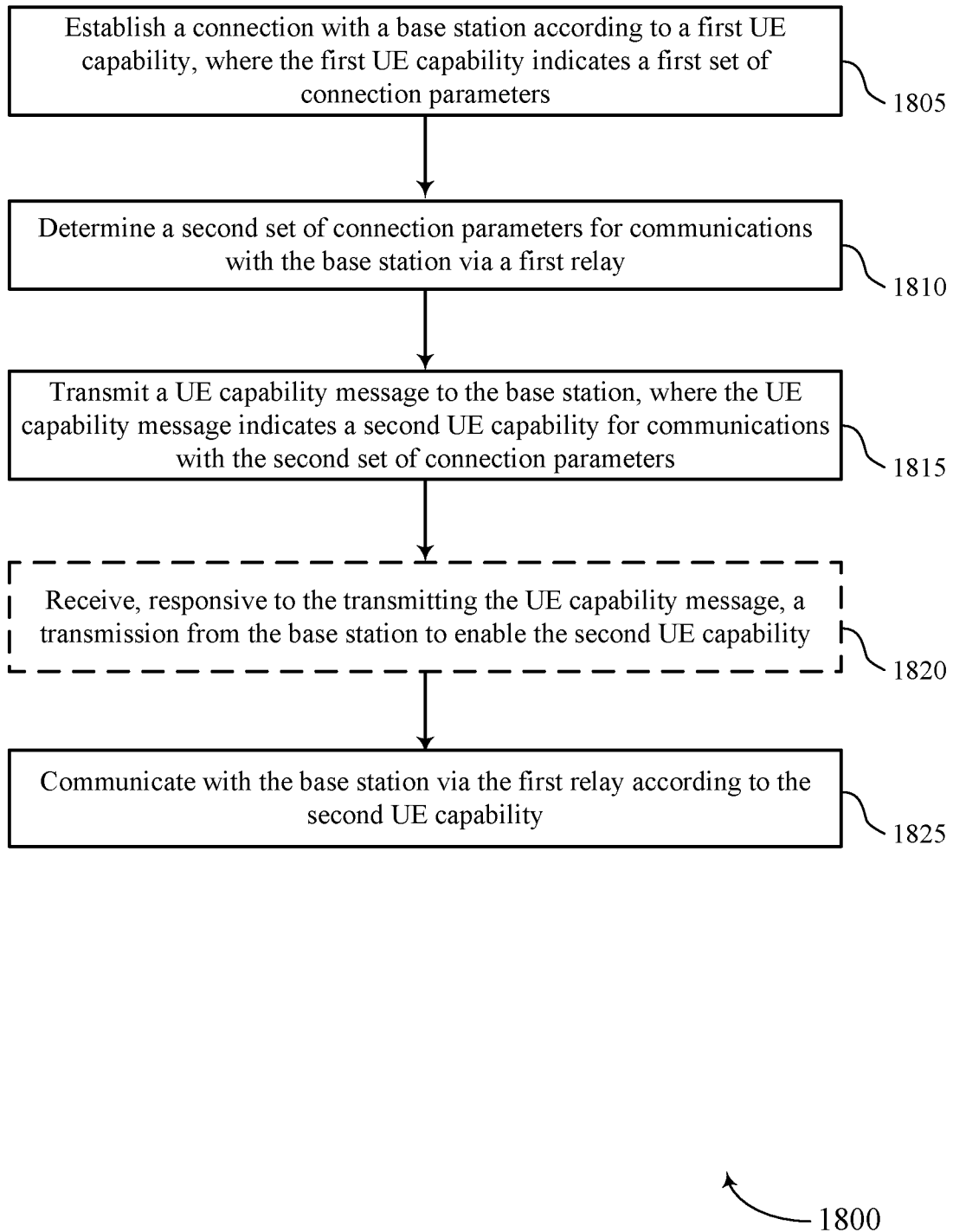
FIGS. 18 through 21 show flowcharts illustrating methods that support UE capability signaling techniques for wireless communications systems with relays in accordance with aspects of the present disclosure.

FIG. 18 shows a flowchart illustrating a method 1800 that supports UE capability signaling techniques for wireless communications systems with relays in accordance with aspects of the present disclosure. The operations of method 1800 may be implemented by a UE 115 or its components as described herein. For example, the operations of method 1800 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1805, the UE may establish a connection with a base station according to a first UE capability, where the first UE capability indicates a first set of connection parameters. The operations of 1805 may be performed according to the methods described herein. In some examples, aspects of the operations of 1805 may be performed by a RRC manager as described with reference to FIGS. 10 through 13.

At 1810, the UE may determine a second set of connection parameters for communications with the base station via a first relay. The operations of 1810 may be performed according to the methods described herein. In some examples, aspects of the operations of 1810 may be performed by a relay connection manager as described with reference to FIGS. 10 through 13.

At 1815, the UE may transmit a UE capability message to the base station, where the UE capability message indicates a second UE capability for communications with the second set of connection parameters. The operations of 1815 may be performed according to the methods described herein. In some examples, aspects of the operations of 1815 may be performed by an UE capability manager as described with reference to FIGS. 10 through 13.

Optionally, at 1820, the UE may receive, responsive to the transmitting the UE capability message, a transmission from the base station to enable the second UE capability. The operations of 1820 may be performed according to the methods described herein. In some examples, aspects of the operations of 1820 may be performed by an UE capability manager as described with reference to FIGS. 10 through 13.

At 1825, the UE may communicate with the base station via the first relay according to the second UE capability. The operations of 1825 may be performed according to the methods described herein. In some examples, aspects of the operations of 1825 may be performed by a relay connection manager as described with reference to FIGS. 10 through 13. In some cases, transmissions between the UE and the first relay are on a second frequency band and transmissions between the base station and the first relay are on a first frequency band.

Figure 19:
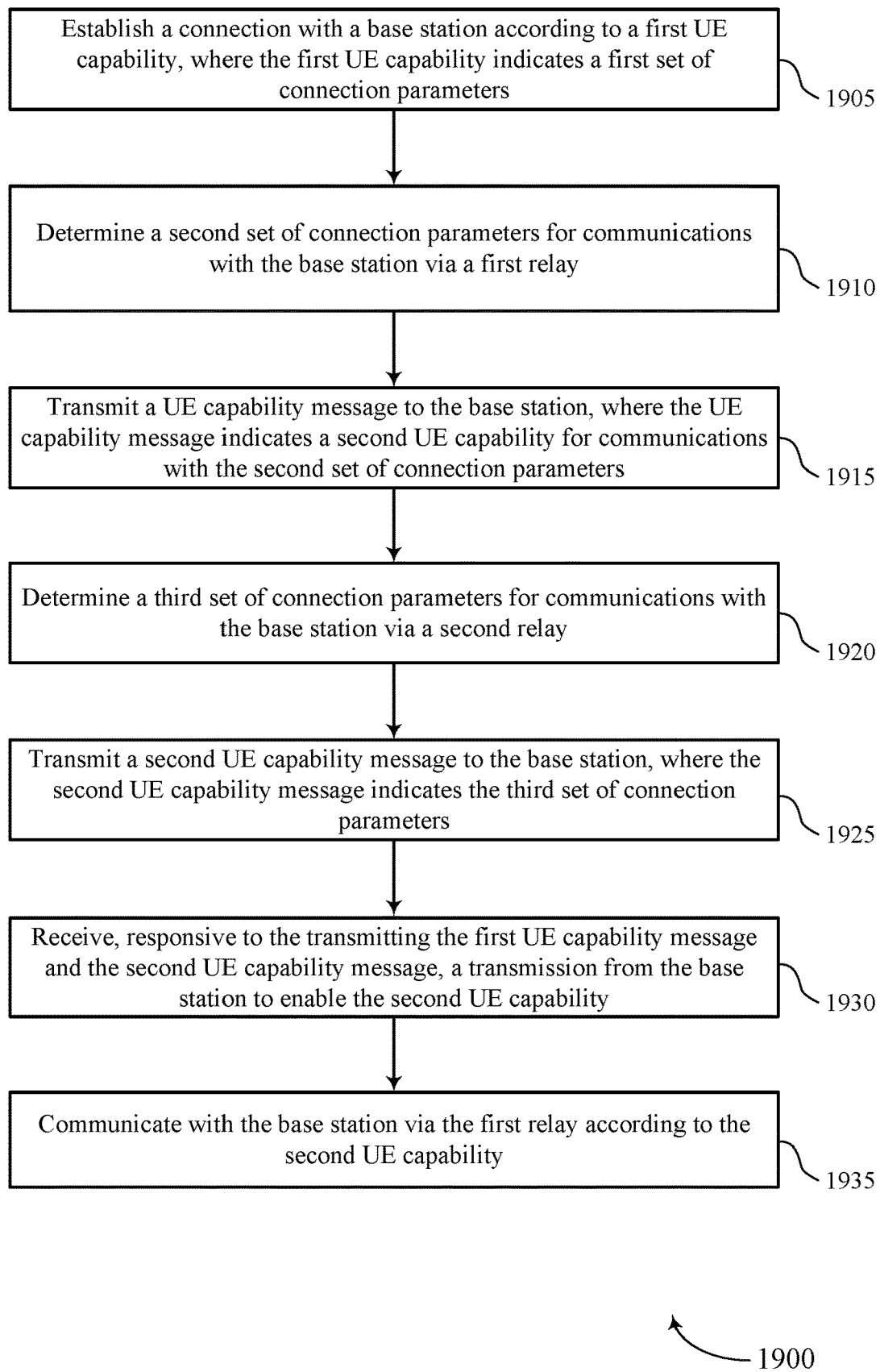

FIG. 19 shows a flowchart illustrating a method 1900 that supports UE capability signaling techniques for wireless communications systems with relays in accordance with aspects of the present disclosure. The operations of method 1900 may be implemented by a UE 115 or its components as described herein. For example, the operations of method 1900 may be performed by a communications manager as described with reference to FIGS. 10 through 13. In some examples, a UE may execute a set of instructions to control the functional elements of the UE to perform the functions described below. Additionally or alternatively, a UE may perform aspects of the functions described below using special-purpose hardware.

At 1905, the UE may establish a connection with a base station according to a first UE capability, where the first UE capability indicates a first set of connection parameters. The operations of 1905 may be performed according to the methods described herein. In some examples, aspects of the operations of 1905 may be performed by a RRC manager as described with reference to FIGS. 10 through 13.

At 1910, the UE may determine a second set of connection parameters for communications with the base station via a first relay. The operations of 1910 may be performed according to the methods described herein. In some examples, aspects of the operations of 1910 may be performed by a relay connection manager as described with reference to FIGS. 10 through 13.

At 1915, the UE may transmit a UE capability message to the base station, where the UE capability message indicates a second UE capability for communications with the second set of connection parameters. The operations of 1915 may be performed according to the methods described herein. In some examples, aspects of the operations of 1915 may be performed by an UE capability manager as described with reference to FIGS. 10 through 13.

At 1920, the UE may determine a third set of connection parameters for communications with the base station via a second relay. The operations of 1920 may be performed according to the methods described herein. In some examples, aspects of the operations of 1920 may be performed by a relay connection manager as described with reference to FIGS. 10 through 13.

At 1925, the UE may transmit a second UE capability message to the base station, where the second UE capability message indicates the third set of connection parameters. The operations of 1925 may be performed according to the methods described herein. In some examples, aspects of the operations of 1925 may be performed by an UE capability manager as described with reference to FIGS. 10 through 13.

At 1930, the UE may receive, responsive to the transmitting the first UE capability message and the second UE capability message, a transmission from the base station to enable the second UE capability. The operations of 1930 may be performed according to the methods described herein. In some examples, aspects of the operations of 1930 may be performed by an UE capability manager as described with reference to FIGS. 10 through 13.

At 1935, the UE may communicate with the base station via the first relay according to the second UE capability. The operations of 1935 may be performed according to the methods described herein. In some examples, aspects of the operations of 1935 may be performed by a relay connection manager as described with reference to FIGS. 10 through 13.

Figure 20:
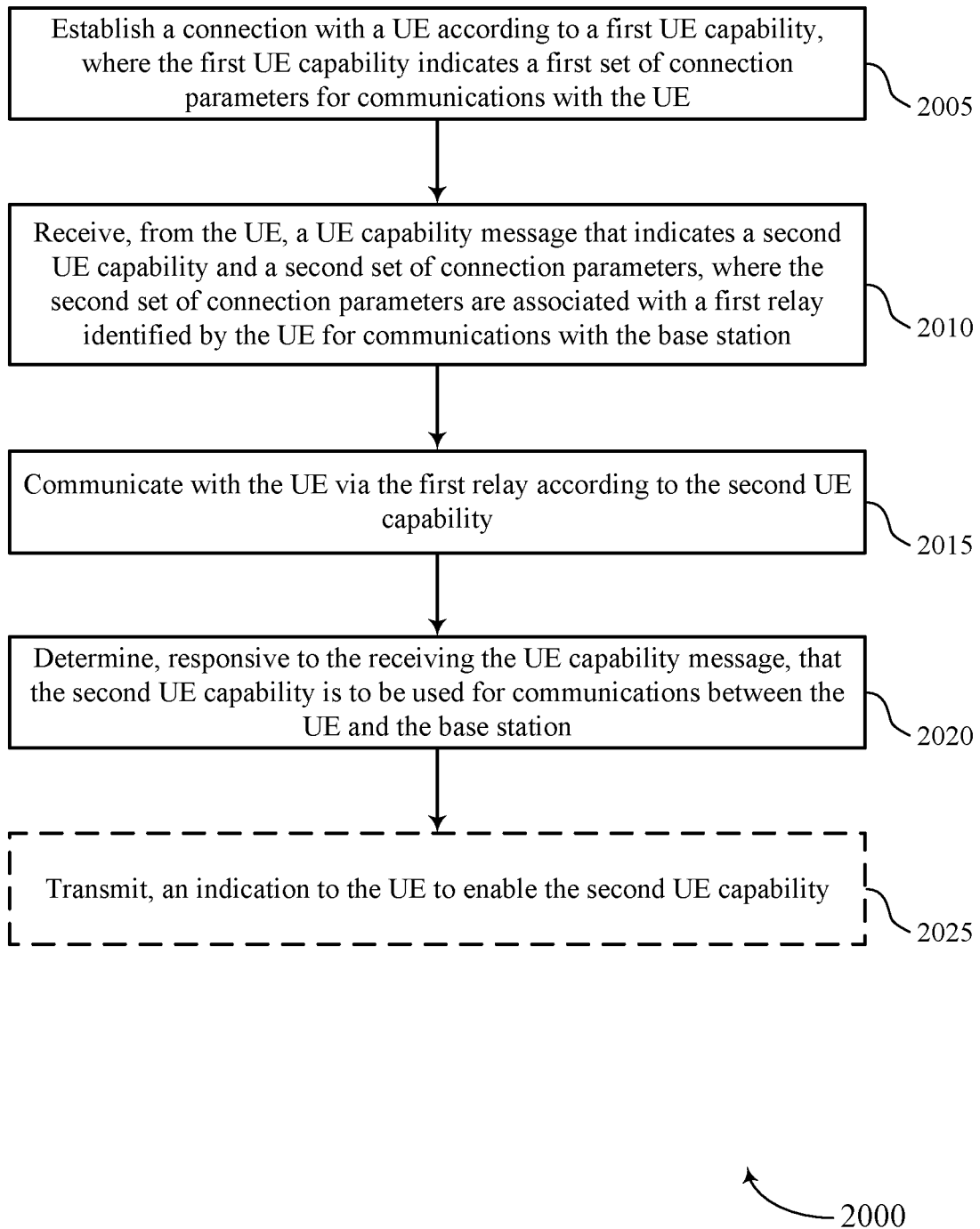

FIG. 20 shows a flowchart illustrating a method 2000 that supports UE capability signaling techniques for wireless communications systems with relays in accordance with aspects of the present disclosure. The operations of method 2000 may be implemented by a base station 105 or its components as described herein. For example, the operations of method 2000 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2005, the base station may establish a connection with a UE according to a first UE capability, where the first UE capability indicates a first set of connection parameters for communications with the UE. The operations of 2005 may be performed according to the methods described herein. In some examples, aspects of the operations of 2005 may be performed by a RRC manager as described with reference to FIGS. 14 through 17.

At 2010, the base station may receive, from the UE, a UE capability message that indicates a second UE capability and a second set of connection parameters, where the second set of connection parameters are associated with a first relay identified by the UE for communications with the base station. The operations of 2010 may be performed according to the methods described herein. In some examples, aspects of the operations of 2010 may be performed by an UE capability manager as described with reference to FIGS. 14 through 17.

At 2015, the base station may communicate with the UE via the first relay according to the second UE capability. The operations of 2015 may be performed according to the methods described herein. In some examples, aspects of the operations of 2015 may be performed by a relay connection manager as described with reference to FIGS. 14 through 17.

At 2020, the base station may determine, responsive to the receiving the UE capability message, that the second UE capability is to be used for communications between the UE and the base station. The operations of 2020 may be performed according to the methods described herein. In some examples, aspects of the operations of 2020 may be performed by an UE capability manager as described with reference to FIGS. 14 through 17.

Optionally, at 2025, the base station may transmit, an indication to the UE to enable the second UE capability. The operations of 2025 may be performed according to the methods described herein. In some examples, aspects of the operations of 2025 may be performed by an UE capability manager as described with reference to FIGS. 14 through 17.

Figure 21:
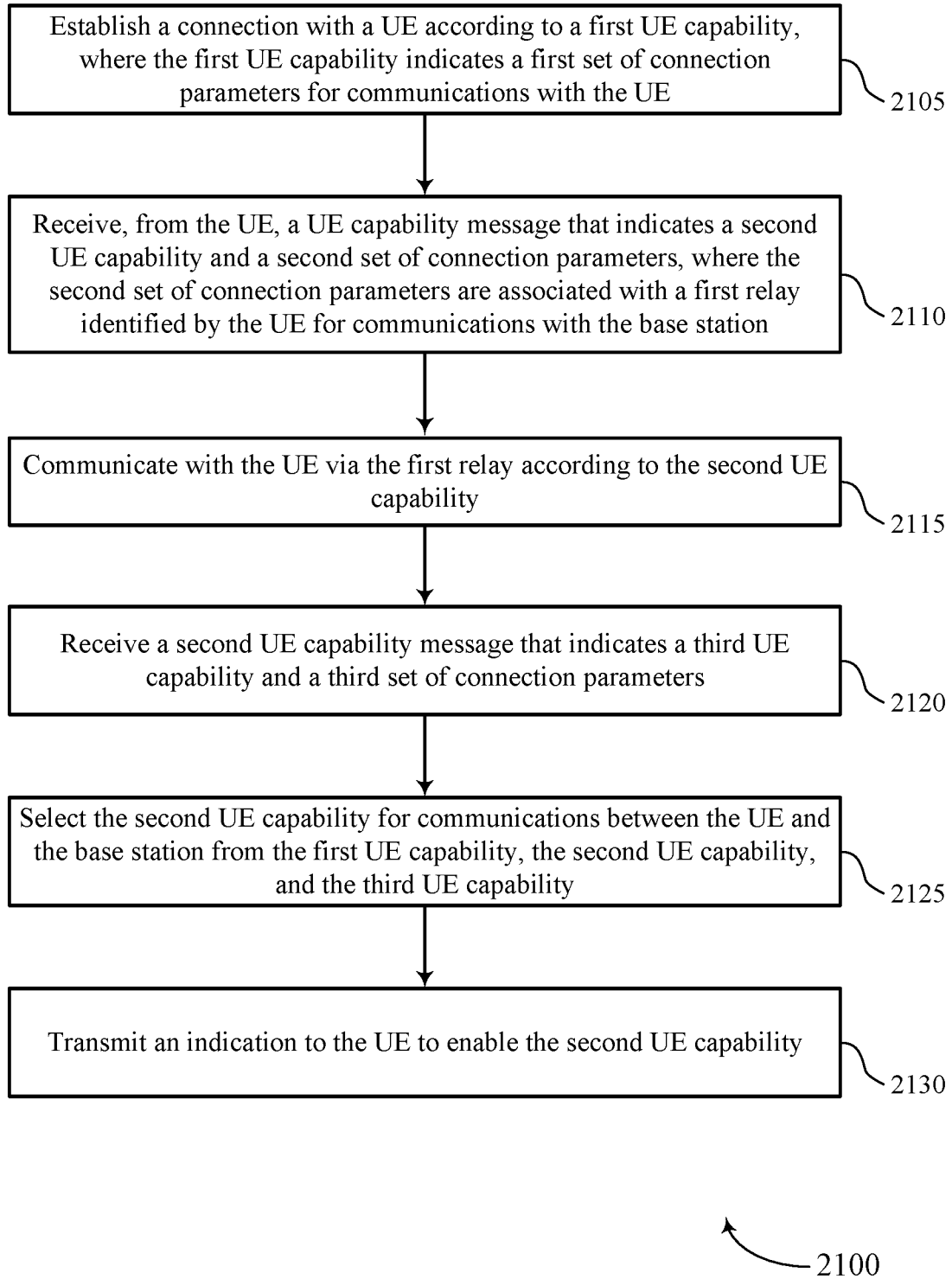

FIG. 21 shows a flowchart illustrating a method 2100 that supports UE capability signaling techniques for wireless communications systems with relays in accordance with aspects of the present disclosure. The operations of method 2100 may be implemented by a base station 105 or its components as described herein. For example, the operations of method 2100 may be performed by a communications manager as described with reference to FIGS. 14 through 17. In some examples, a base station may execute a set of instructions to control the functional elements of the base station to perform the functions described below. Additionally or alternatively, a base station may perform aspects of the functions described below using special-purpose hardware.

At 2105, the base station may establish a connection with a UE according to a first UE capability, where the first UE capability indicates a first set of connection parameters for communications with the UE. The operations of 2105 may be performed according to the methods described herein. In some examples, aspects of the operations of 2105 may be performed by a RRC manager as described with reference to FIGS. 14 through 17.

At 2110, the base station may receive, from the UE, a UE capability message that indicates a second UE capability and a second set of connection parameters, where the second set of connection parameters are associated with a first relay identified by the UE for communications with the base station. The operations of 2110 may be performed according to the methods described herein. In some examples, aspects of the operations of 2110 may be performed by an UE capability manager as described with reference to FIGS. 14 through 17.

At 2115, the base station may communicate with the UE via the first relay according to the second UE capability. The operations of 2115 may be performed according to the methods described herein. In some examples, aspects of the operations of 2115 may be performed by a relay connection manager as described with reference to FIGS. 14 through 17.

At 2120, the base station may receive a second UE capability message that indicates a third UE capability and a third set of connection parameters. The operations of 2120 may be performed according to the methods described herein. In some examples, aspects of the operations of 2120 may be performed by an UE capability manager as described with reference to FIGS. 14 through 17.

At 2125, the base station may select the second UE capability for communications between the UE and the base station from the first UE capability, the second UE capability, and the third UE capability. The operations of 2125 may be performed according to the methods described herein. In some examples, aspects of the operations of 2125 may be performed by an UE capability manager as described with reference to FIGS. 14 through 17.

At 2130, the base station may transmit an indication to the UE to enable the second UE capability. The operations of 2130 may be performed according to the methods described herein. In some examples, aspects of the operations of 2130 may be performed by an UE capability manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1×, 1 X, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    establishing a connection with an access network entity according to a first UE capability, wherein the first UE capability indicates a first set of connection parameters for communications directly between the UE and the access network entity;
    determining a second set of connection parameters for communications with the access network entity via a first relay, the second set of connection parameters based at least in part on a number of antennas at the first relay available for communications with the access network entity;

transmitting a UE capability message to the access network entity, wherein the UE capability message indicates a second UE capability for communications via the first relay with the second set of connection parameters; and communicating with the access network entity via the first relay according to the second UE capability.

2. The method of claim 1, wherein:

the connection with the access network entity according to the first UE capability uses a first frequency band, and wherein transmissions between the UE and the first relay are on a second frequency band and transmissions between the access network entity and the first relay are on the first frequency band.

3. The method of claim 1, further comprising:

receiving, responsive to the transmitting the UE capability message, a transmission from the access network entity to enable the second UE capability, and wherein the communicating with the access network entity via the first relay is performed responsive to the transmission from the access network entity to enable the second UE capability.

4. The method of claim 1, wherein the second set of connection parameters include one or more of a number of antennas available for communications, a maximum supportable data rate associated with communications via the first relay, an acknowledgment timeline for communicating acknowledgment feedback between the UE and the access network entity, a downlink-to-uplink grant timeline between the UE receiving a grant and transmitting a responsive uplink transmission, a feedback processing timeline, one or more quality of service parameters, or any combinations thereof.

5. The method of claim 4, wherein the number of antennas available for communications correspond to the number of antennas at the first relay available for communications with the access network entity, and wherein the number of antennas at the first relay is greater than a number of antennas at the UE that are available for communications with the access network entity.

6. The method of claim 4, wherein the one or more quality of service parameters include one or more of a latency parameter, an error rate parameter, a jitter parameter, or any combinations thereof.

7. The method of claim 1, wherein the UE capability message is a first UE capability message, and wherein the method further comprises:

determining a third set of connection parameters for communications with the access network entity via a second relay;

transmitting a second UE capability message to the access network entity, wherein the second UE capability message indicates the third set of connection parameters; and receiving, responsive to the transmitting the first UE capability message and the second UE capability message, a transmission from the access network entity to enable the second UE capability, and wherein the communicating with the access network entity via the first relay is performed responsive to the transmission from the access network entity to enable the second UE capability.

8. The method of claim 1, further comprising:

determining a third set of connection parameters for communications with the access network entity via a second relay; and wherein the UE capability message indicates the second set of connection parameters that are associated with the first relay and indicates the third set of connection parameters that are associated with the second relay.

9. The method of claim 8, wherein the communicating with the access network entity is via both the first relay and the second relay according to the second UE capability.

10. The method of claim 1, wherein the first relay comprises a layer 1 relay between the access network entity and the UE, and wherein the first relay performs at least a portion of physical layer processing of traffic that is transmitted between the UE and the access network entity.

11. An apparatus for wireless communication at a user equipment (UE), comprising: a processor, memory coupled with the processor; and instructions stored in the memory and executable by the processor to cause the apparatus to:

establish a connection with an access network entity according to a first UE capability, wherein the first UE capability indicates a first set of connection parameters for communications directly between the UE and the access network entity;

determine a second set of connection parameters for communications with the access network entity via a first relay, the second set of connection parameters based at least in part on a number of antennas at the first relay available for communications with the access network entity;

transmit a UE capability message to the access network entity, wherein the UE capability message indicates a second UE capability for communications via the first relay with the second set of connection parameters; and communicate with the access network entity via the first relay according to the second UE capability.

12. The apparatus of claim 11, wherein:

the connection with the access network entity according to the first UE capability uses a first frequency band, and wherein transmissions between the UE and the first relay are on a second frequency band and transmissions between the access network entity and the first relay are on the first frequency band.

13. The apparatus of claim 11, wherein the instructions are further executable by the processor to cause the apparatus to:

receive, responsive to the transmitting the UE capability message, a transmission from the access network entity to enable the second UE capability, and wherein the communicating with the access network entity via the first relay is performed responsive to the transmission from the access network entity to enable the second UE capability.

14. The apparatus of claim 11, wherein the second set of connection parameters include one or more of a number of antennas available for communications, a maximum supportable data rate associated with communications via the first relay, an acknowledgment timeline for communicating acknowledgment feedback between the UE and the access network entity, a downlink-to-uplink grant timeline between the UE receiving a grant and transmitting a responsive uplink transmission, a feedback processing timeline, one or more quality of service parameters, or any combinations thereof.

15. The apparatus of claim 14, wherein the number of antennas available for communications correspond to the number of antennas at the first relay available for communications with the access network entity, and wherein the number of antennas at the first relay is greater than a number of antennas at the UE that are available for communications with the access network entity.

* * * * *